US010586193B2

(12) United States Patent
Yanicke et al.

(10) Patent No.: US 10,586,193 B2
(45) Date of Patent: Mar. 10, 2020

(54) MOBILE ASSESSMENT TOOL

(71) Applicant: The Travelers Indemnity Company, Hartford, CT (US)

(72) Inventors: Steven Yanicke, Hartford, CT (US); John Grandpre, Waterbury, CT (US); Steven D. Roach, West Hartford, CT (US); William DeLeo, Somerville, MA (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 873 days.

(21) Appl. No.: 14/581,323

(22) Filed: Dec. 23, 2014

(65) Prior Publication Data

US 2016/0180265 A1    Jun. 23, 2016

(51) Int. Cl.
*G06Q 30/00* (2012.01)
*G06Q 10/06* (2012.01)
(Continued)

(52) U.S. Cl.
CPC ....... *G06Q 10/0635* (2013.01); *G06Q 10/025* (2013.01); *G06Q 10/047* (2013.01);
(Continued)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS 8,510,196 B1 * 8/2013 Brandmaier .......... G06Q 40/08
705/35
9,253,349 B2    2/2016 Amtrup et al.
(Continued)

OTHER PUBLICATIONS

Sheppard et al., Capturing Quality: Retaining Provenance for Curated Volunteer Monitoring Data. Proceedings of the 17th ACM Conference on Computer Supported Cooperative Work & Social Computing, Feb. 2014. pp. 1234-1245 (Year: 2014).*

*Primary Examiner* — Patricia H Munson
*Assistant Examiner* — Uche Byrd
(74) *Attorney, Agent, or Firm* — Cantor Colburn LLP

(57) ABSTRACT

A system for mobile assessments is provided. The system includes a processing device and a memory device. The memory device stores instructions that when executed by the processing device may result in receiving an assessment request associated with physical assets at a remote location relative to an initiator system of the assessment request. An assessment type may be determined based on the assessment request. One or more interactive assessment forms can be retrieved from a database based on the assessment type. The interactive assessment forms may be populated with assessment data based on one or more observed conditions of the physical assets at the remote location. Image data associated with the observed conditions can be captured. The image data can be linked with the assessment data to establish relationship metadata. The image data, the assessment data, and the relationship metadata may be transmitted for storage in the database.

16 Claims, 16 Drawing Sheets

(51) Int. Cl.
*G07C 5/02* (2006.01)
*G06Q 50/30* (2012.01)
*G06Q 10/02* (2012.01)
*G06Q 10/04* (2012.01)

(52) U.S. Cl.
CPC ......... *G06Q 10/0639* (2013.01); *G06Q 30/00* (2013.01); *G06Q 50/30* (2013.01); *G07C 5/02* (2013.01)

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | |
|---|---|---|---|
| 9,280,793 B2 | 3/2016 | English et al. | |
| 9,282,202 B2* | 3/2016 | Gowen | G06F 3/1242 |
| 2011/0016412 A1* | 1/2011 | Grosz | G06K 9/6267 |
| | | | 715/760 |
| 2011/0040681 A1* | 2/2011 | Ahroon | G06Q 20/10 |
| | | | 705/39 |
| 2012/0317202 A1* | 12/2012 | Lewis | G01S 19/17 |
| | | | 709/204 |
| 2013/0262530 A1 | 10/2013 | Collins et al. | |
| 2014/0067433 A1* | 3/2014 | Hargrove | G06Q 10/10 |
| | | | 705/4 |
| 2015/0033148 A1* | 1/2015 | Kuchoor | G06F 17/241 |
| | | | 715/753 |
| 2016/0171622 A1* | 6/2016 | Perkins | G06Q 40/08 |
| | | | 705/4 |

* cited by examiner

FIG. 9

MOBILE ASSESSMENT TOOL

BACKGROUND

Assessors such as insurance assessors, tax assessors, and various types of inspectors are typically required to personally visit a physical location to examine one or more assets. Assessors may also collect information about the custodian of the assets, property conditions at the physical location, contracts between the custodian and third parties, and other relevant information. Assessors typically use a collection of paper-based forms to gather the needed information and then manually enter the information into a computer system upon returning to their respective place of business. Data collected during an on-site visit can be subsequently analyzed by an account executive to draw conclusions about the potential value of the assets, liability risks, and other such assessments. If questions are raised or further information is needed, one or more assessors may need to travel back to the physical location to conduct supplemental information gathering. The use of paper-based forms can lead to data entry errors, handwriting interpretation difficulties, and a longer lead time between data collection and account executive decisions. In some instances, once the data have been saved to a computer system, printed hardcopies of the completed forms are saved to physical files and/or stored in an electronic format on a local desktop computer.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 9 depicts another example of a user interface according to some embodiments of the present invention;

DETAILED DESCRIPTION

According to an embodiment, a mobile assessment tool is provided that enables assessment data collection and linking of image data with assessment data using a mobile computing device. The mobile assessment tool provides user interfaces for an assessor to capture data associated with physical assets at a remote location relative to an initiator system of an assessment request. The term "remote location" as used herein indicates a geographic difference in physical location between a location where an assessment occurs and a location of the initiator system. An assessment request can be in the form of an electronic message, an electronic notification, or an audio-based request. The mobile assessment tool can support a variety of assessment types that may each have one or more interactive assessment forms. For example, interactive assessment forms for performing an insurance risk assessment for an industrial equipment dealer may have a different sequence and content than a car rental company or a factory. In an insurance risk assessment, for example, an insurance risk representative visits one or more locations to determine a value of risk related to physical assets, operational characteristics of a business, known hazards, existing protection and controls, and the like. In a business context, operational exposures can be related to sales, rental, leasing, servicing and repair operations, as well as site-specific risks, such as theft or damage of property, facility condition and maintenance, and the like. Risk assessment may consider the value and condition of physical assets in addition to potential sources of liability, effectiveness of risk transfer by contracts, and general business practices.

Further, embodiments of the invention enhance computer system performance by logging assessment data from the mobile computing device into a network-accessible database, which can also be accessed by a management application at another location. Interactive data collection can be performed between the management application and the mobile assessment tool, including real-time interactions. Making the interactive assessment forms available via the network-accessible database further enables form updates to flow to the mobile assessment tool to ensure that latest version of the forms for the assessment type are used by the assessors. The mobile assessment tool also enables capturing of image data and linking the image data to the assessment data in the network-accessible database. Further features are described in greater detail herein.

Figure 1:
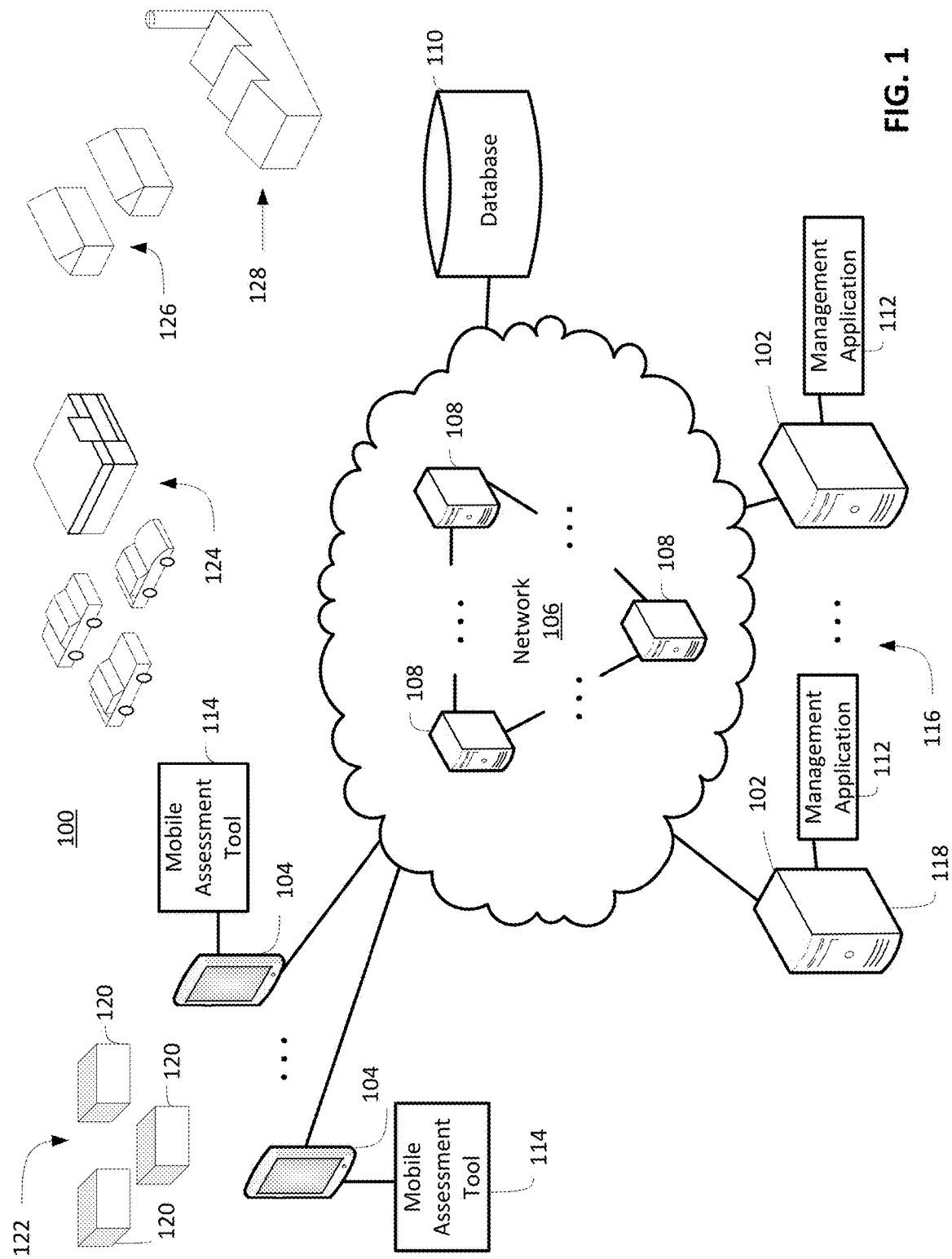
FIG. 1 depicts a block diagram of a system according to some embodiments of the present invention.

Turning now to FIG. 1, a system 100 is depicted upon which an assessment data collection process may be implemented. The system 100 includes one or more management computer systems 102 and one or more mobile computing devices 104 that can communicate via a network 106. The network 106 may be a cloud-computing network that includes a plurality of cloud servers 108 operable to access a database 110. The database 110 is a network-accessible database such as a cloud-based database that can be read from and written to by the management computer systems 102 and the mobile computing devices 104. Each of the management computer systems 102 may have a management application 112 that provides a management user interface for accessing the database 110, and each of the mobile computing devices 104 may have a mobile assessment tool 114 that provides an assessor user interface for accessing the database 110.

Each of the management computer systems 102 may be a personal computer (e.g., a laptop, desktop, etc.), a workstation, or server that can access data in the database 110 and communicate with one or more of the mobile computing devices 104. The mobile computing devices 104 may be any type of portable computing device capable of executing the mobile assessment tool 114 and interfacing with the network 106, such as a tablet computer, a smartphone, a notebook computer, a netbook computer, and the like. The cloud servers 108 can be any type of computing node operable to support networking functions of the network 106, including a combination of physical and virtual machines.

In the example of FIG. 1, each of the management computer systems 102, the mobile computing devices 104, and the cloud servers 108 can include a processor (e.g., a processing device such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. Each of the management computer systems 102, the mobile computing devices 104, and the cloud servers 108 can include a local data storage device, such as a memory device to store instructions and data. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein. In one example, at least one of the mobile computing devices 104 executes computer instructions for implementing the exemplary processes described herein. Although only the management application 112 and the mobile assessment tool 114 are depicted in FIG. 1, it will be understood that each of the management computer systems 102, the mobile computing devices 104, and the cloud servers 108 can execute a number of other programs, such as application programs and operating systems. The management application 112 and the mobile assessment tool 114 may each be further subdivided into a number of modules or sub-programs.

The network 106 may establish communication within the system 100 using a combination of networks, such as a wide area network (WAN), a local area network (LAN), a global network (e.g., Internet), a virtual private network (VPN), and/or an intranet. The network 106 may support fiber optic, wired, and/or wireless communication links. The network 106 can support transmission of digitized data including digitized images, video, audio, and/or other data types. Other networks (not depicted) can also be utilized by elements of the system 100, such as cellular communication, satellite communication, and other network types known in the art.

The database 110 may be implemented using a variety of devices for storing electronic information. It is understood that the database 110 may be implemented using memory contained in one or more of the cloud servers 108 or may be a separate physical system, as shown in FIG. 1. It will be understood that multiple storage devices may be employed to store the database 110. For example, the storage devices used to store the database 110 can be dispersed across the network 106, and each of the storage devices that collectively form the database 110 may be logically addressable as a consolidated data source across a distributed environment.

In some embodiments, the management computer systems 102 can be located at a common location or in a plurality of different locations. In the example of FIG. 1, the management computer systems 102 are located at an office location 116, from which an assessor may travel to perform the assessment. One of the management computer systems 102 may be referred to as an initiator system 118 if it is used to send an assessment request to one or more of the mobile computing devices 104. The assessment request can indicate that a particular user or users of one or more of the mobile computing devices 104 should initiate an assessment of a plurality of physical assets 120 at a remote location 122 relative to the initiator system 118. For example, the remote location 122 may be the place of business of an equipment dealer seeking insurance for the physical assets 120 and/or transactions associated with the business. The physical assets 120 can be any type of property that has an associated risk of loss, damage, or liability. A series of interactive assessment forms used by the mobile assessment tool 114 can be selected based on an assessment type specific to the type of physical assets 120 and/or business/residence type at the remote location 122. For instance, interactive assessment forms used at one location 124 may be associated with a vehicle rental business, while interactive assessment forms at another location 126 can be for residential assessments, and interactive assessment forms at yet another location 128 may be for factory/manufacturer assessments. Any number of assessment types can be supported using the system 100.

Figure 2:
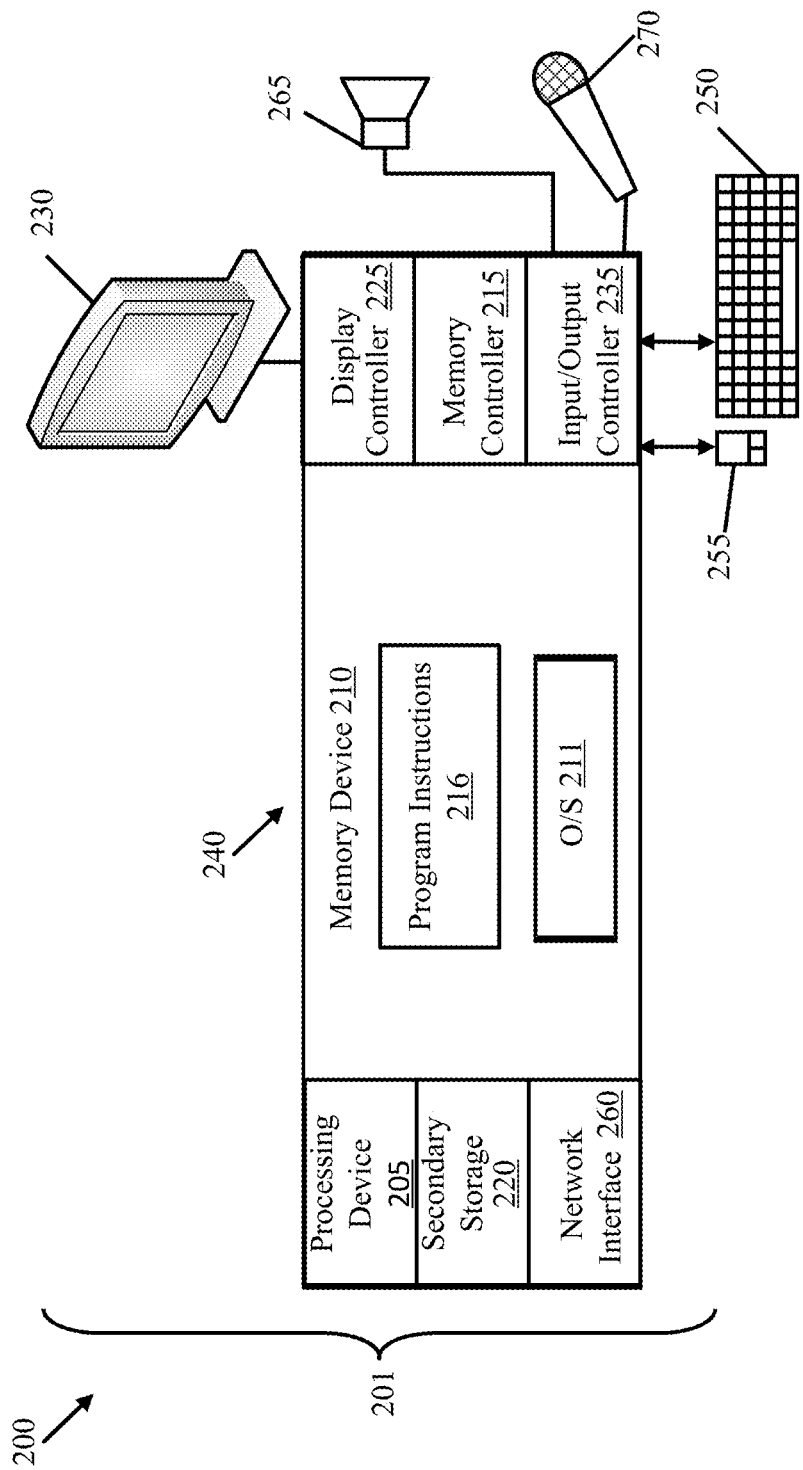
FIG. 2 depicts a block diagram of an initiator system according to some embodiments of the present invention.

FIG. 2 depicts a block diagram of a system 200 according to an embodiment. The system 200 is depicted embodied in a computer 201 in FIG. 2. The system 200 is an example of the management computer systems 102 of FIG. 1. The cloud servers 108 of FIG. 1 can also include similar computer elements as depicted in the computer 201 of FIG. 2.

In an exemplary embodiment, in terms of hardware architecture, as shown in FIG. 2, the computer 201 includes a processing device 205 and a memory device 210 coupled to a memory controller 215 and an input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230. One or more speaker 265 and/or a microphone 270 can be coupled to the input/output controller 235 to support audio interactions with one or more of the mobile computing devices 104. In an embodiment, the computer 201 can support Voice over Internet Protocol (VoIP) or other communication protocols known in the art.

The processing device 205 is a hardware device for executing software, particularly software stored in secondary storage 220 or memory device 210. The processing device 205 can be any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the management application 112 of FIG. 1, where the system 200 is an embodiment of the management computer systems 102 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the management computer systems 102 of FIG. 1, the network interface 260 can establish communication channels with one or more mobile computing devices 104 of FIG. 1 and/or the database 110 of FIG. 1 via the network 106 of FIG. 1.

Figure 3:
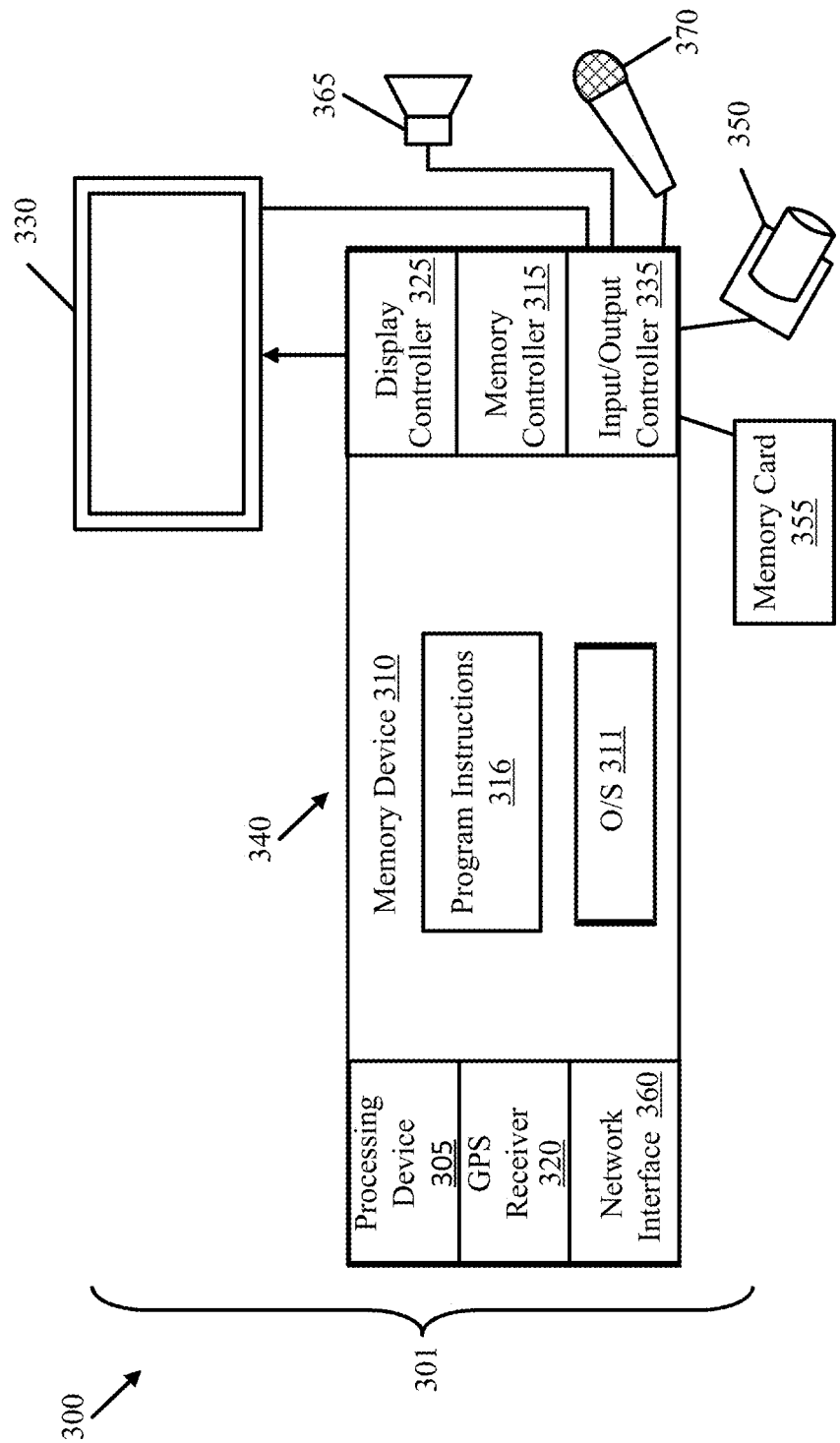
FIG. 3 depicts a block diagram of a mobile device according to some embodiments of the present invention.

FIG. 3 depicts a block diagram of a system 300 according to an embodiment. The system 300 is depicted embodied in a mobile computing device 301 in FIG. 3. The system 300 is an example of the mobile computing devices 104 of FIG. 1.

In an exemplary embodiment, in terms of hardware architecture, as shown in FIG. 3, the mobile computing device 301 includes a processing device 305 and a memory device 310 coupled to a memory controller 315 and an input/output controller 335. The input/output controller 335 can be, for example, but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the mobile computing device 301 may include address, control, and/or data connections to enable appropriate communications among the aforementioned components.

In some embodiments, a touch-sensitive display 330 or similar device can be coupled to the input/output controller 335. Alternatively, input may be received via a keypad, keyboard, or motion sensitive interface (not depicted). The input/output controller 335 can receive image data via one or more integrated camera 350. Extended storage capacity for image data, video, and the like may be supported using a memory card 355 interfaced to the input/output controller 335. The input/output controller 335 may also be coupled to one or more speaker 365 and/or microphone 370 to support audio interactions with one or more of the management computer systems 102 and database 110 of FIG. 1. In an embodiment, the mobile computing device 301 can support VoIP, cellular transmissions, or other communication protocols known in the art. The mobile computing device 301 can further include a display controller 325 coupled to the touch-sensitive display 330. In an alternate embodiment, a standard video display is provided in place of the touch-sensitive display 330 and other inputs, such as a keyboard and touchpad, are used to provide input to the mobile computing device 301.

The processing device 305 is a hardware device for executing software, particularly software stored in memory device 310. The processing device 305 can be any custom made or commercially available computer processor, a central processing unit (CPU), an auxiliary processor among several processors associated with the mobile computing device 301, a semiconductor-based microprocessor (in the form of a microchip or chip set), a macro-processor, or generally any device for executing instructions.

The memory device 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 310 may incorporate electronic, magnetic, optical, and/or other types of storage media. Accordingly, the memory device 310 is an example of a tangible computer readable storage medium 340 upon which instructions executable by the processing device 305 may be embodied as a computer program product. The memory device 310 can have a distributed architecture, where various components are situated remote from one another, but can be accessed by the processing device 305.

The instructions in memory device 310 may include one or more separate programs, each of which comprises an ordered listing of executable instructions for implementing logical functions. In the example of FIG. 3, the instructions in the memory device 310 include a suitable operating system (OS) 311 and program instructions 316. The operating system 311 essentially controls the execution of other computer programs and provides scheduling, input-output control, file and data management, memory management, and communication control and related services. When the mobile computing device 301 is in operation, the processing device 305 is configured to execute instructions stored within the memory device 310, to communicate data to and from the memory device 310, and to generally control operations of the mobile computing device 301 pursuant to the instructions. Examples of program instructions 316 can include instructions to implement the mobile assessment tool 114 of FIG. 1, where the mobile computing device 301 is an embodiment of the mobile computing devices 104 of FIG. 1.

The mobile computing device 301 may also include a global position system (GPS) receiver 320. The GPS receiver 320 may be used to generate geotags to apply to other data managed by the mobile computing device 301, such as image data (photos and/or video), audio, and other data values recorded. Geotags can identify a location where data was captured, such as coordinates of the remote location 122 where the physical assets 120 of FIG. 1 were located when associated data were captured. An internal clock (not depicted) can also provide date/time information with the geotag or as a separate data tag for assessment data, image data, and other data captured by the mobile computing device 301.

The mobile computing device 301 also includes a network interface 360 that can establish communication channels with one or more other computer systems via one or more network links. The network interface 360 can support wired and/or wireless communication protocols known in the art. For example, when embodied in one of the mobile computing devices 104 of FIG. 1, the network interface 360 can establish communication channels with one or more management computer systems 102 of FIG. 1 and/or the database 110 of FIG. 1 via the network 106 of FIG. 1. The network interface 360 may also support one or more other types of networks, such as a cellular network and/or satellite communication. In some embodiments, the network interface 360 supports communication protocols that enable the mobile computing device 301 to directly link with electronic assets during an assessment, such as a security system, programmable thermostat, fire detection system, and/or other localized device(s) or network(s) to acquire status and history information. For instance, the network interface 360 may support Wi-Fi, Bluetooth, near-field communication (NFC), radio frequency identification (RFID), and the like.

Figure 4:
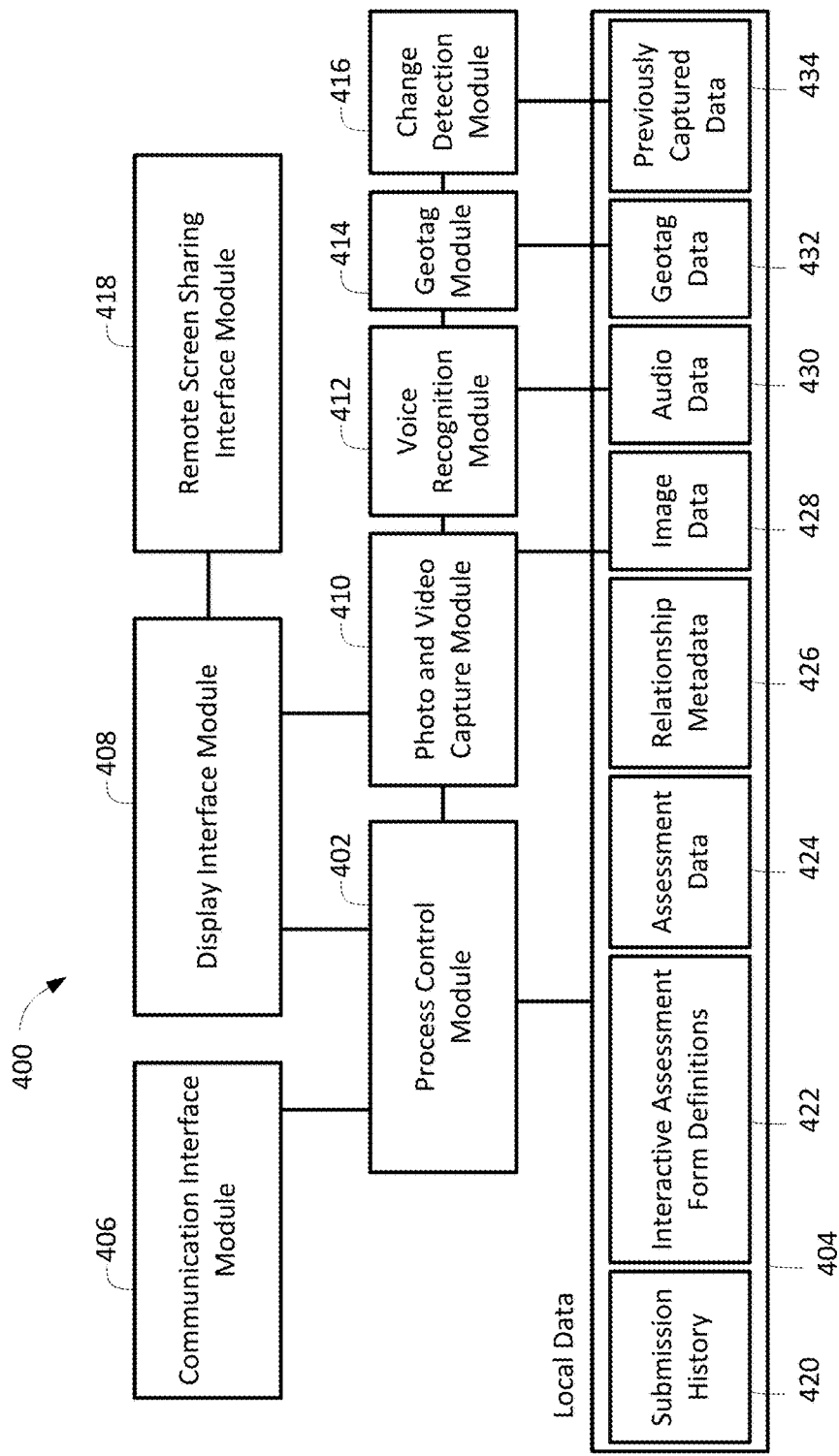
FIG. 4 depicts relationships between modules and data according to some embodiments of the present invention.

FIG. 4 depicts relationships between modules and data in one of the mobile computing devices 104 of FIG. 1 according to some embodiments. In the example of FIG. 4, a plurality of modules 400 implement functionality of the mobile assessment tool 114 of FIG. 1. The modules 400 can be executable groups of the program instructions 316 of FIG. 3 formatted as executable objects, scripts, functions, or the like using a programming language that is compatible with the operating system 311 of FIG. 3. A process control module 402 can control sequencing of data acquisition and interactions with local data 404 that may be stored in the memory device 310 or memory card 355 of FIG. 3. The process control module 402 may interface with a communication interface module 406 that establishes external communication via the network interface 360 of FIG. 3. The process control module 402 can also interface with a display interface module 408, a photo and video capture module 410, a voice recognition module 412, a geotag module 414, a change detection module 416, and a remote screen sharing interface module 418.

The local data 404 may include, for example, a submission history 420, interactive assessment form definitions 422, assessment data 424, relationship metadata 426, image data 428, audio data 430, geotag data 432, previously captured data 434, and other data (not depicted). The submission history 420 can keep track of user sessions that may be completed or started but not yet completed. The interactive assessment form definitions 422 can provide a local copy of definitions or templates to use for capturing the assessment data 424. The relationship metadata 426 defines relationships between the assessment data 424 and other data, such as image data 428, audio data 430, and/or geotag data 432. The image data 428 can include photos and/or videos captured by the photo and video capture module 410 via the integrated camera 350 and the microphone 370 of FIG. 3 for video. The photo and video capture module 410 and/or other modules may support image recognition and comparison to identify assets or conditions and search for associated data to support an assessment. The audio data 430 can include data captured by the microphone 370 of FIG. 3. The voice recognition module 412 may access the audio data 430 and convert digitized audio data into text data for storage in the database 110 of FIG. 1. The geotag data 432 can be populated by the geotag module 414 based on data from the GPS receiver 320 of FIG. 3. The geotag data 432 can be added to the image data 428 for inclusion in the database 110 of FIG. 1 or can be managed with respect to the assessment data 424 and/or the audio data 430.

The previously captured data 434 can be a local copy of data retrieved from the database 110 of FIG. 1 for use by the change detection module 416. For instance, the previously captured data 434 can include records associated with the assessment data 424, the image data 428, the audio data 430, and/or the geotag data 432. Changes detected by the change detection module 416 may highlight data entry differences where observed conditions of the physical assets 120 of FIG. 1 have changed, such as appearing in a degraded or damaged condition relative to the previously captured data 434 or have been fixed, replaced, or otherwise improved. Change comparisons can be performed on an image basis using newly captured values of image data 428 or a location basis using geotag data 432 to determine whether movement or repositioning of a physical asset has occurred.

The remote screen sharing interface module 418 can transmit a real-time copy of a user interface of the mobile assessment tool 114 of FIG. 1 to the initiator system 118 of FIG. 1 based on receiving a screen sharing request. The remote screen sharing interface module 418 may also interface with multiple systems to support screen sharing and other real-time interactions to multiple systems. For instance, a second screen sharing request can be received from a second system, such as a management computer system 102 other than the initiator system 118 of FIG. 1. In such a case the remote screen sharing interface module 418 can perform simultaneous real-time screen sharing to both the initiator system 118 and the second system based on the screen sharing request from the initiator system 118 and the second screen sharing request from the second system. Screen sharing, which may also be referred to as screen mirroring, can include providing a copy of data displayed by the display interface module 408 on the touch-sensitive display 330 to another display, such as the display 230 of FIG. 2. When screen sharing is performed, one or more users of the management computer systems 102 of FIG. 1 can observe data collection action prior to submission to the database 110 of FIG. 1. During observation, one or more users of the management computer systems 102 of FIG. 1 may provide feedback to a user of the mobile assessment tool 114 of FIG. 1 to guide actions performed. For instance, a two-way audio interface can be established between the mobile computing device 104 of FIG. 1 and the initiator system 118 of FIG. 1 that is active while populating one or more interactive assessment forms and capturing the image data 428 associated with one or more observed conditions of the physical assets 120 of FIG. 1.

Figure 5A:
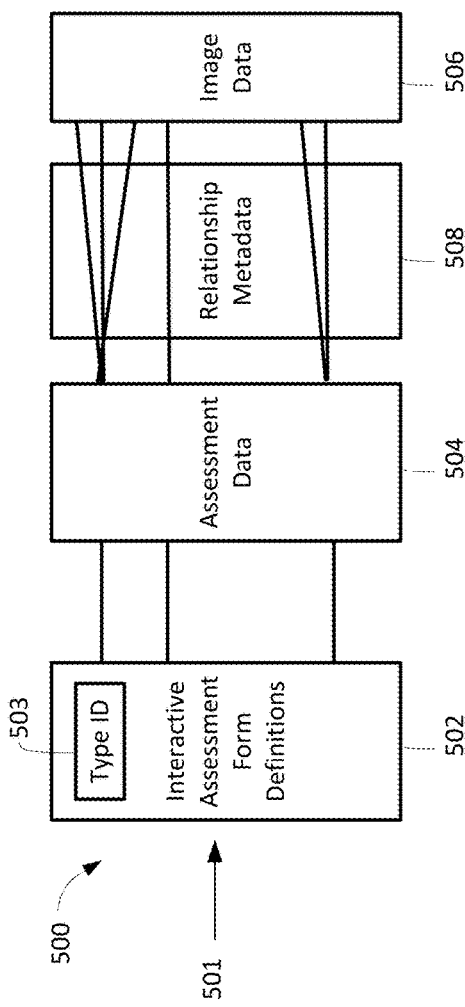
FIG. 5A depicts an example data structure in a database according to some embodiments of the present invention.

FIG. 5A depicts an example data structure 500 that may be stored in the database 110 of FIG. 1. An assessment record 501 in the data structure 500 may include interactive assessment form definitions 502 with related values of assessment data 504 captured during an assessment. An assessment type identifier 503 can be included in the assessment record 501 to distinguish between a plurality of different assessment types that may be managed using the data structure 500, e.g., a rental business assessment, a retail sales business assessment, an industrial manufacturer assessment, etc. The assessment record 501 can also include image data 506 for physical assets, such as the physical assets 120 of FIG. 1. A physical asset may have multiple associated photos and/or videos in the image data 506 to capture different views and angles of one or more observed conditions. For example, if there is damage to one of the physical assets 120 of FIG. 1, a number of photos can capture different views of the damage. Photos and/or videos may also be used to capture any label data, barcodes, quick-response codes, or other identification markings of the physical assets 120 of FIG. 1. Image data 506 can also be used to capture document images that support the assessment, such as contracts, agreements, sales receipts, and the like. The assessment record 501 can include relationship metadata 508 to establish links between the image data 506 and the assessment data 504. For example, a link in the relationship metadata 508 may establish a one-to-one relationship between one of the physical assets 120 of FIG. 1 and a photo or video in the image data 506. Alternatively, multiple links in the relationship metadata 508 can establish a one-to-many relationship between one of the physical assets 120 of FIG. 1 and photos and/or videos in the image data 506.

The interactive assessment form definitions 502 can be sent to the mobile assessment tool 114 of FIG. 1 upon initiating or resuming an assessment, where a local copy can be temporarily stored in one of the mobile computing devices 104 of FIG. 1 as the interactive assessment form definitions 422 of FIG. 4 for use during an assessment. The interactive assessment form definitions 502 may also be sent to the management application 112 of FIG. 1 to assist in understanding the assessment data 504 and the image data 506 when transferred from the database 110 of FIG. 1. As a user of the mobile assessment tool 114 of FIG. 1 gathers data, local copies can be maintained in the local data 404 of FIG. 4 (e.g., in assessment data 424, relationship metadata 426, and image data 428 of FIG. 4) until a submission process transfers and updates values of the assessment data 504, relationship metadata 508, and image data 506 in the database 110 of FIG. 1. Values of the assessment data 504, relationship metadata 508, and/or image data 506 may also be transferred from the database 110 of FIG. 1 to the mobile assessment tool 114 of FIG. 1 as the previously captured data 434 of FIG. 4 such that the mobile assessment tool 114 of FIG. 1 can highlight changes as newer values are collected.

While only a single instance of the assessment record 501 is depicted in FIG. 5A, it will be understood that the data structure 500 can include many assessment records 501. The assessment record 501 can include additional information and data not depicted in FIG. 5A. For example, each assessment record 501 may have an index value to support lookup operations, time/date stamps, and other assessment-related data.

Figure 5B:
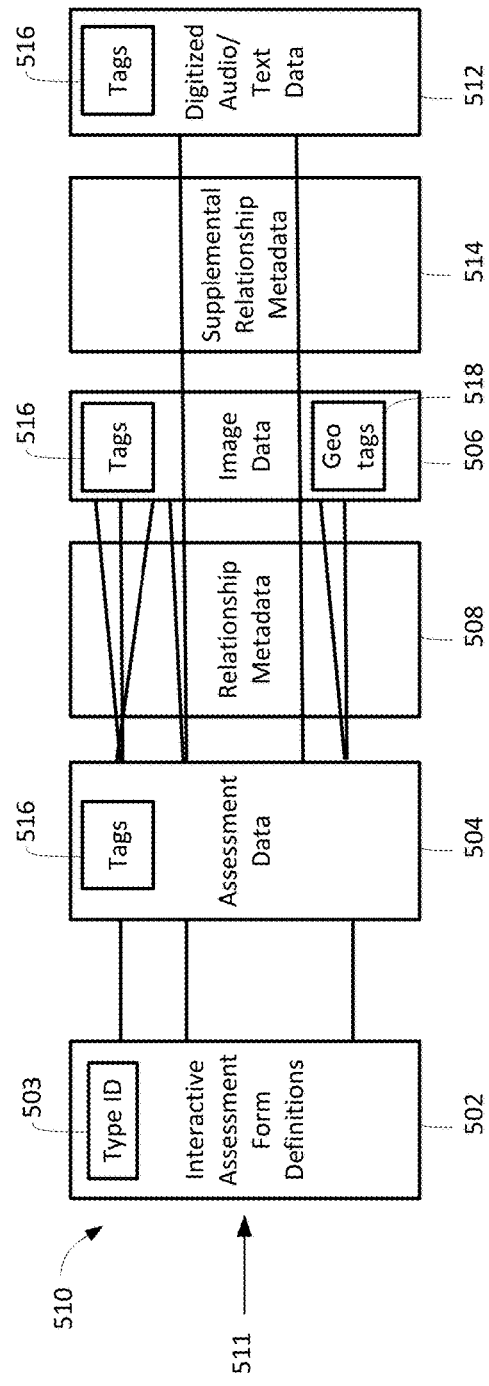
FIG. 5B depicts another example data structure in a database according to some embodiments of the present invention.

FIG. 5B depicts another example data structure 510 that may be stored in the database 110 of FIG. 1. An assessment record 511 in the data structure 500 may include the interactive assessment form definitions 502 with related values of assessment data 504 captured during an assessment. Also, similar to the assessment record 501 of FIG. 5A, the assessment record 511 can include the assessment type identifier 503, image data 506, and relationship metadata 508. Additionally, the assessment record 511 may include digitized audio data 512 that can be stored in a digitized audio format or converted into text data. The digitized audio data 512 can include audio notes describing information associated with the assessment. Supplemental relationship metadata 514 can store links between the digitized audio data 512 and the assessment data 504. The supplemental relationship metadata 514 may establish one-to-one or one-to-many relationships between one of the physical assets 120 of FIG. 1 and an audio file or text file in the digitized audio data 512. Data associated with a physical asset in the assessment data 504 may have links to both the image data 506 and the digitized audio data 512. Other assessment related information, such as general descriptions of the remote location 122 of FIG. 1 can also be captured and linked in the image data 506 and/or the digitized audio data 512.

The assessment record 511 can also include searchable tags 516 that may be associated with the assessment data 504, the image data 506, and/or the digitized audio data 512. The searchable tags 516 may include descriptive terms that enable searching, filtering, and/or sorting within the assessment record 511 and across multiple records. For example, as multiple assessment records 511 are collected, a user of the management application 112 of FIG. 1 can search for features, such as a particular type of boiler, across many assessment records 511 to compare images for typical conditions at various points of service life.

Geotag data 518 may also be included in the assessment record 511, for instance, as part of the image data 506. The geotag data 518 can provide a location reference point to assist in searching of data and may also be used to determine whether one or more of the physical assets 120 of FIG. 1 has been moved since a previous assessment.

While only a single instance of the assessment record 511 is depicted in FIG. 5B, it will be understood that the data structure 510 can include many assessment records 511. The assessment record 511 can include additional information and data not depicted in FIG. 5B. For example, each assessment record 511 may have an index value to support lookup operations, time/date stamps, and other assessment-related data.

Figure 6:
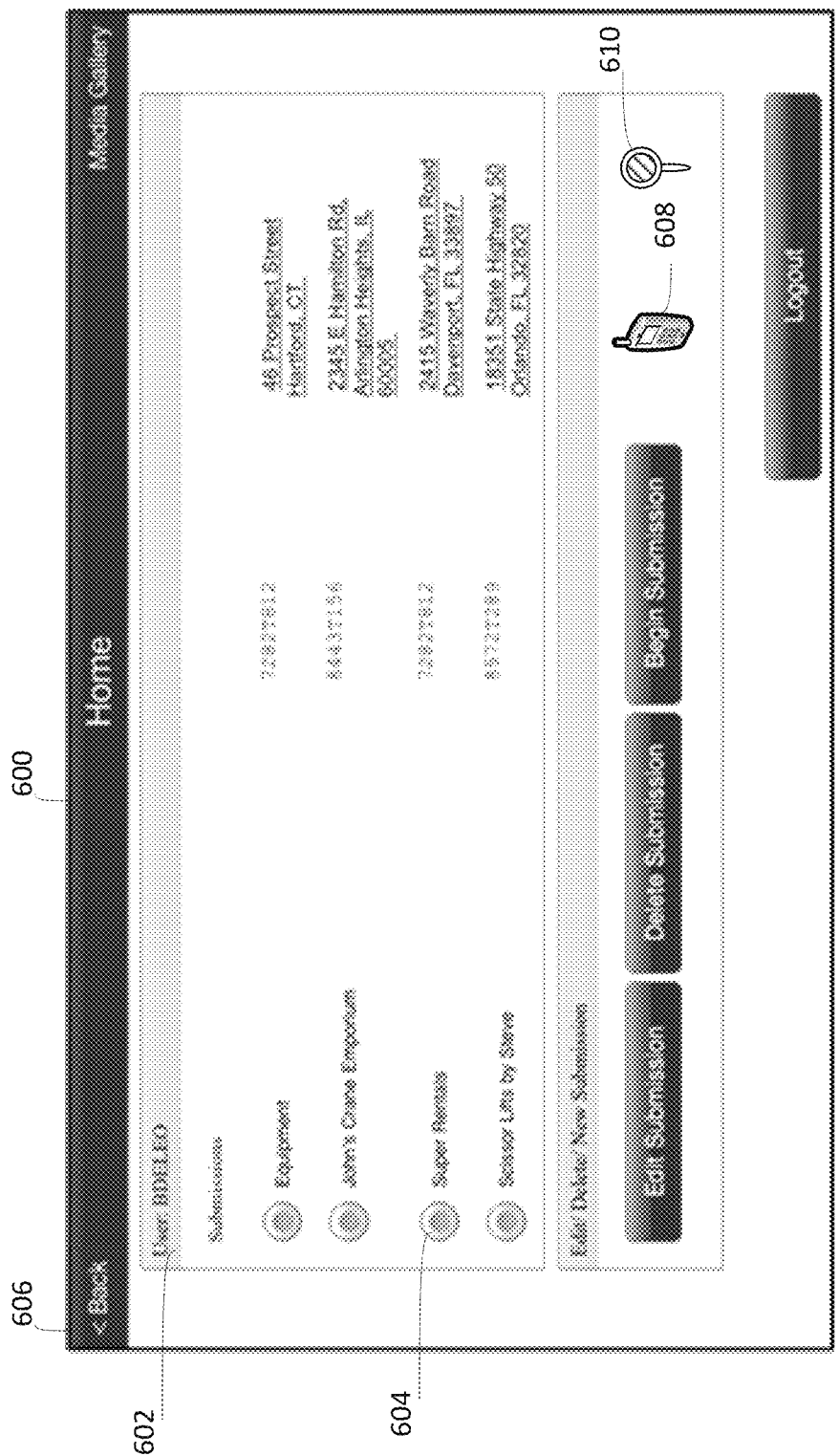
FIG. 6 depicts a user interface according to some embodiments of the present invention.

FIG. 6 depicts an example of a user interface 600 of the mobile assessment tool 114 of FIG. 1. In the example of FIG. 6, a user of the mobile assessment tool 114 can perform an insurance risk assessment at remote location 122 of FIG. 1 via the user interface 600. An insurance risk assessment can involve a series of questions to gather data related to a current or potential policyholder in order to assess potential risk of losses and assign a value to the risk. Different business types can have customized sets of questions which can be presented to an assessor in a predetermined sequence. FIGS. 6-13 as further described herein present a sample of the types of data which can be collected using the mobile assessment tool 114 for a particular business type, an industrial equipment dealer in this example. An insurance risk assessor would typically access the user interface 600 when preparing to capture assessment-related data at the location of the assessment, such as at remote location 122 of FIG. 1. The user interface 600 is a simplified example of a home or main screen where a current user 602 can select from one or more previous submissions 604 for editing or deleting.

Alternatively, the current user 602 can begin a new submission or logout. The submission history 420 of FIG. 4 can be accessed for a history of previous submissions to be displayed as the one or more previous submissions 604. Upon selecting one of the one or more previous submissions 604 for editing, associated data can be requested from the database 110 of FIG. 1 or accessed from the previously captured data 434 of FIG. 4 if already loaded. As one example, a previously captured instance of the assessment data 504 and the image data 506 of FIG. 5A are retrieved from the database 110 of FIG. 1 based on detecting a request to edit one of the one or more previous submissions 604.

The user interface 600 may also include one or more navigation buttons 606 to go back to a previously visited user interface or forward to another user interface. User interfaces can be populated based on the interactive assessment form definitions 422 of FIG. 4 with data captured as the assessment data 424, image data 428, audio data 430, and/or geotag data 432 of FIG. 4. The navigation buttons 606 may allow the current user 602 to populate an assessment in an alternate order without following a strict form completion sequence.

The user interface 600 may also include a command to initiate or accept a two-way audio interface 608 relative to another system, such as the initiator system 118 of FIG. 1. For example, one or more speaker 365 and microphone 370 of FIG. 3 can be enabled for two-way audio communication while populating one or more interactive assessment forms embodied in user interfaces and while capturing any audio and/or image data associated with one or more observed conditions of the physical assets 120 of FIG. 1 along with other observation activities.

The user interface 600 can also include a command to enable remote screen sharing 610 using the remote screen sharing interface module 418 of FIG. 4. When remote screen sharing is enabled, upon a screen sharing request from a system, such as the initiator system 118 of FIG. 1, the remote screen sharing interface module 418 of FIG. 4 may transmit a real-time copy of the user interface 600 and subsequently displayed user interfaces of the mobile assessment tool 114 of FIG. 1 to a requesting system based on receiving the screen sharing request. Multiple screen sharing requests can be supported such that performing simultaneous real-time screen sharing to two or more systems may be performed based on each screen sharing request received. When screen sharing is performed in combination with two-way audio communication, one or more users of the management application 112 of FIG. 1 can see the same content as presented on touch-sensitive display 330 of FIG. 3 rendered locally on the display 230 of FIG. 2, while also interacting by voice.

It will be understood that the user interface 600 of FIG. 6 and subsequently described user interfaces of FIGS. 7-13 are merely examples, and elements can be added or removed. Moreover, the sequence of user interfaces depicted in FIGS. 6-13 represents a subset of user interfaces associated with a subset of the interactive assessment form definitions 502 of FIGS. 5A, 5B as one example of an assessment type. Other assessment types can include customized user interfaces based on different interactive assessment form definitions 502 specific to a particular assessment type identifier 503 (FIGS. 5A, 5B).

Figure 7:
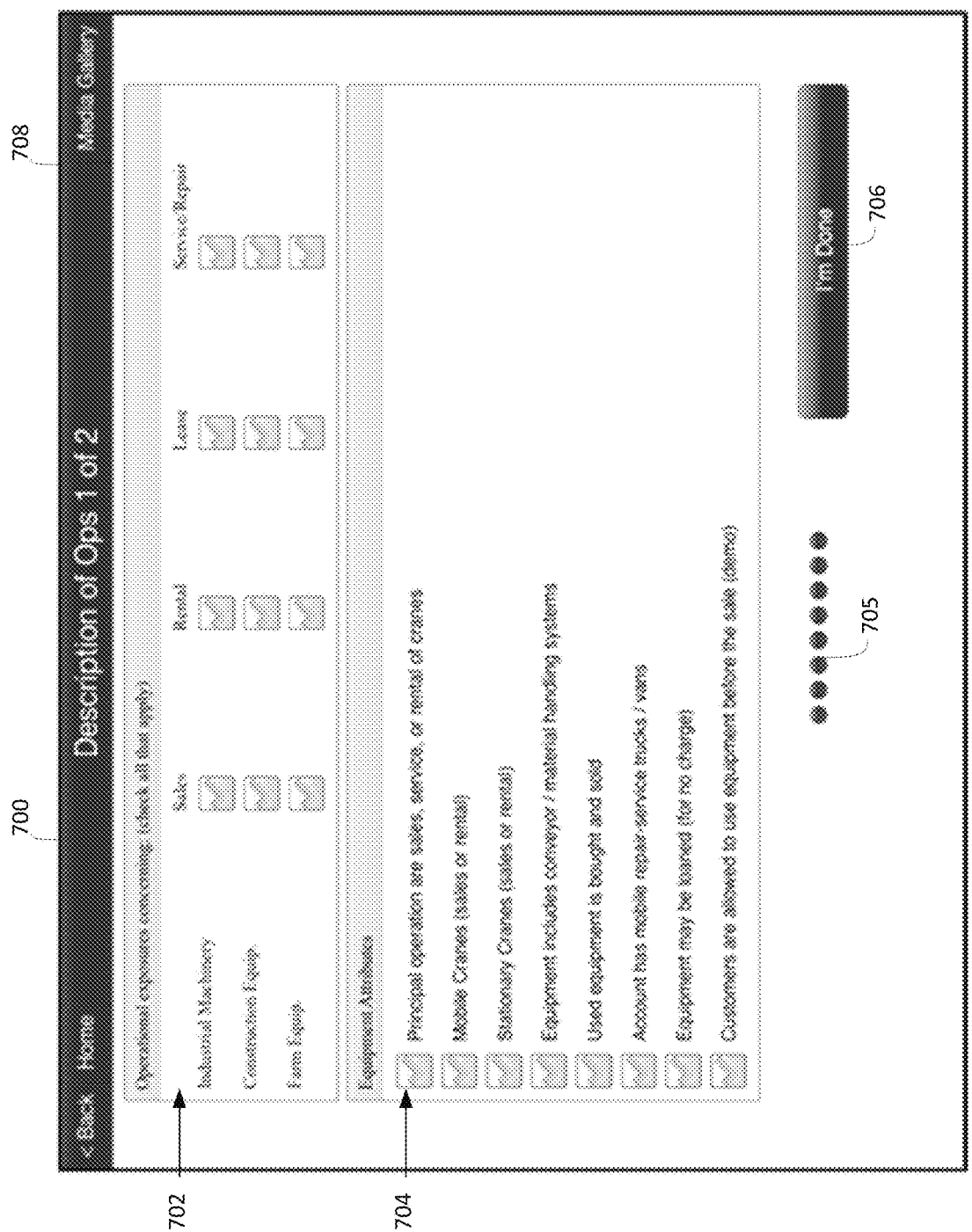
FIG. 7 depicts another example of a user interface according to some embodiments of the present invention.

FIG. 7 depicts another example of a user interface 700 of the mobile assessment tool 114 of FIG. 1 according to some embodiments. The user interface 700 is an example of a first screen for populating a description of operations, including operational exposures 702 and equipment attributes 704. A status bar 705 may indicate relative progress in completing a sequence of user interfaces based on the interactive assessment form definitions 422 of FIG. 4. In one embodiment, the status bar 705 can be interactive, such that clicking or tapping upon the status bar 705 transitions to a different user interface in the assessment sequence. A completion button 706 may be provided to indicate the data entry on the user interface 700 is complete. A media gallery button 708 may be selectable to add or link photo, video, and/or audio data to assessment data for each question in the assessment. An insurance risk assessment can include the gathering of assessment data that describe how assets are used and attributes of the assets, which may be documented in part using photo, video, and/or audio data. In the example of FIG. 7, operational exposures 702 indicate the types of transactions that various equipment types may be involved in, while the equipment attributes 704 can define equipment types, policies, and services related to loaning of equipment, servicing of equipment, equipment accessories, and the like.

Figure 8:
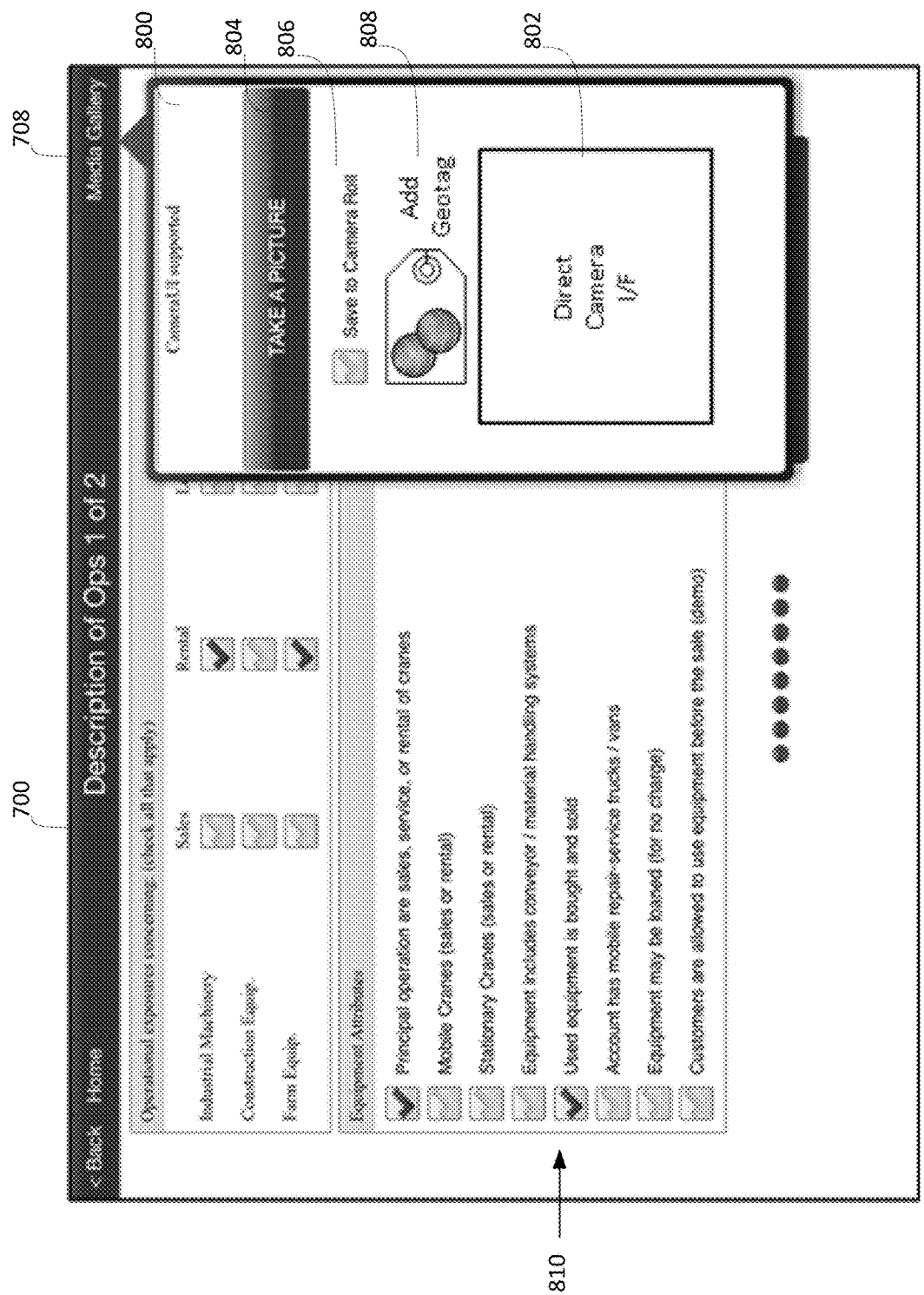
FIG. 8 depicts another example of a user interface according to some embodiments of the present invention.

FIG. 8 depicts another example of the user interface 700 upon selection of the media gallery button 708. The media gallery button 708 may provide one or more options to access existing media files or capture new media. In the example of FIG. 8 a camera user interface 800 is displayed that can include a direct camera interface 802 to display a current field of view of integrated camera 350 of FIG. 3. The camera user interface 800 can include commands to take a picture 804 (i.e., capture the current contents of the direct camera interface 802) and save the image 806 to the image data 428 of FIG. 4 via the photo and video capture module 410 of FIG. 4. The camera user interface 800 may also include a command to add a geotag 808 to the geotag data 432 via geotag module 414 of FIG. 4. Image data captured by the camera user interface 800 can provide a visual record of equipment existence and condition, which may be linked to specific questions. For example, a video or series of photos of used equipment, which may highlight pre-existing damage or other conditions, can be linked to question 810. Geotags can be added with photo or video data to establish the location where the image data was captured. As one example, if equipment is on-loan or being demonstrated at different location than where equipment is typically stored, the assessor may travel to the location and capture both image data and geotag data about the present condition and location of the equipment. In one embodiment, data captured using the camera user interface 800 can be streamed in real-time or near real-time back to the management application 112 of FIG. 1 for immediate analysis.

Figure 9:
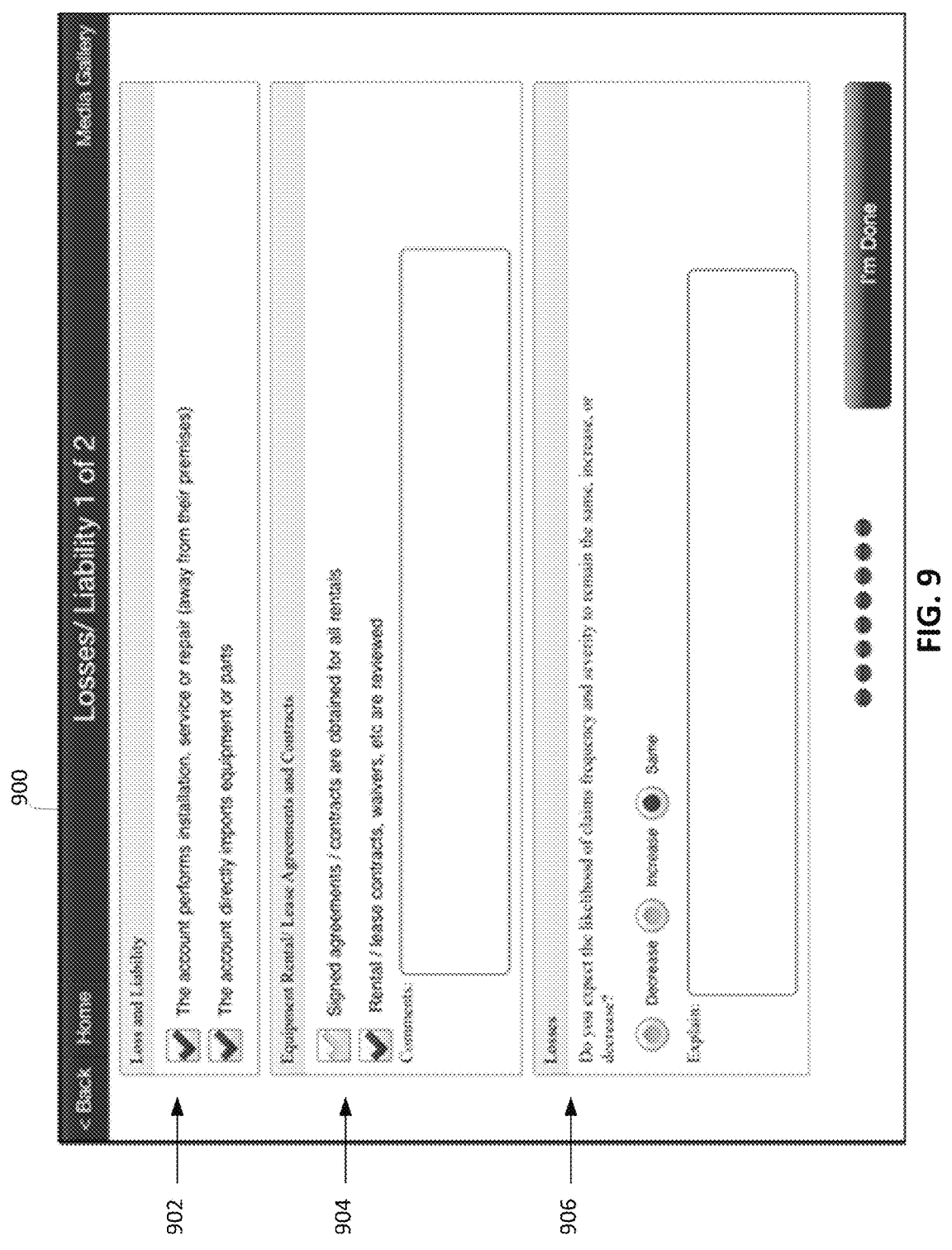

FIG. 9 depicts another example of a user interface 900 of the mobile assessment tool 114 of FIG. 1 according to some embodiments. The user interface 900 is an example of a first screen for populating losses and liabilities data, including loss and liability 902, equipment contracts 904, and losses 906. An insurance risk assessor can collect data in loss and liability 902 to assess whether work is performed offsite and whether any imported assets are received directly or through a third party. The equipment contracts 904 can be used to ensure that temporary transfers of equipment are subject to contracts that include any necessary liability limitations and waivers. The losses 906 provide an area for the assessor to make projections as to the expected likelihood of claim frequency and severity going forward, and to provide an explanation to justify the projection. Similar to the previous described user interfaces 600 and 700 of FIGS. 6-8, the user interface 900 supports a variety of input selection options, such as check boxes, radio buttons, text boxes, and the like. Data entered in the user interface 900 can be stored in the assessment data 424 of FIG. 4 while the sequence of data collection advances through subsequent user interfaces. Photographic evidence of contracts or particular contractual clauses can be linked to the assessment data captured for the equipment contracts 904. To ease the assessor's burden when providing an extensive explanation for the projections related to losses 906, audio or video data can be recorded and linked, if an in-depth description is needed.

Figure 10:
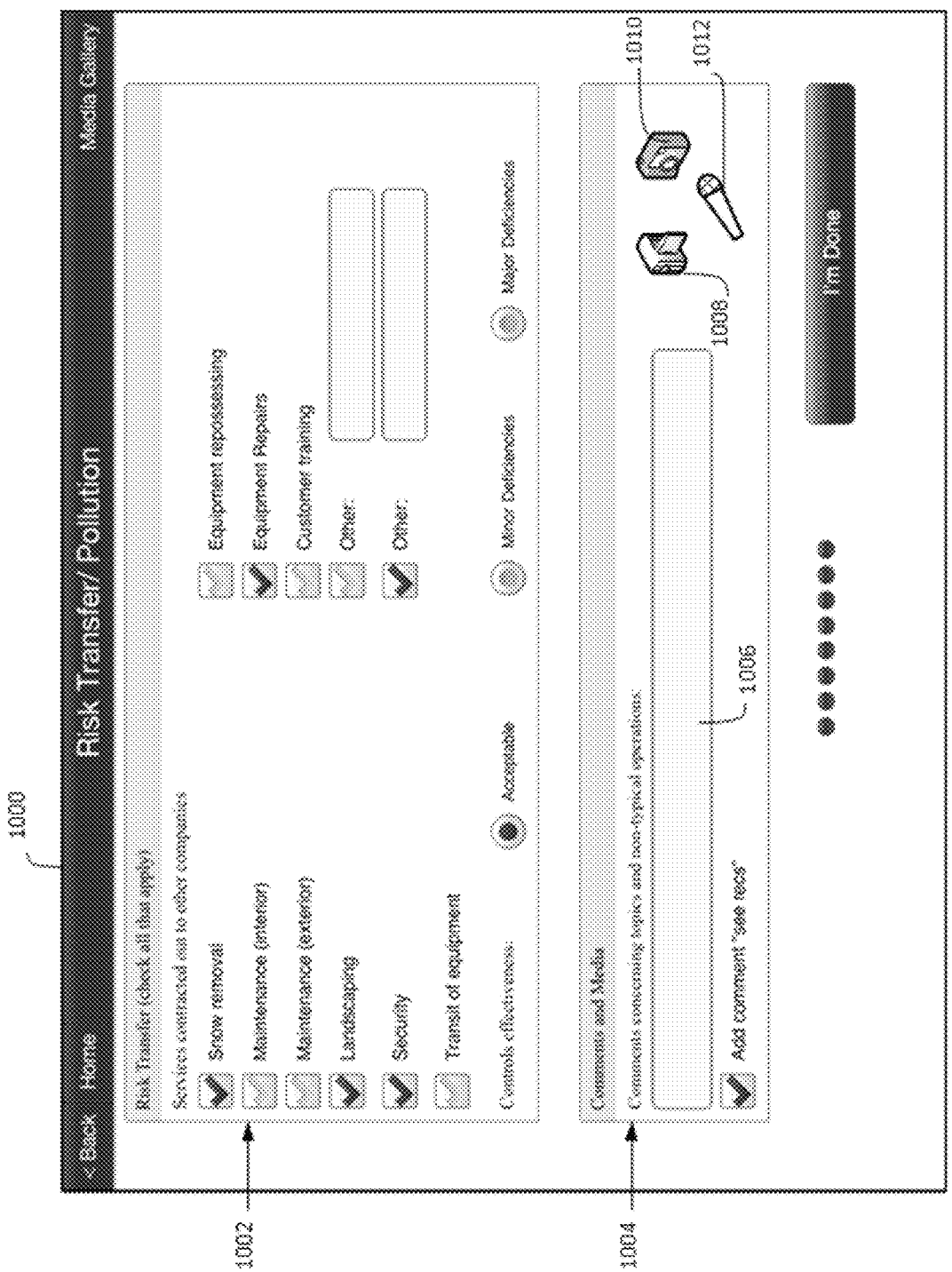
FIG. 10 depicts another example of a user interface according to some embodiments of the present invention.

FIG. 10 depicts another example of a user interface 1000 of the mobile assessment tool 114 of FIG. 1 according to some embodiments. The user interface 1000 is an example of an interface for populating risk transfer and pollution risk information, including risk transfer 1002 and comments/media 1004. The risk transfer 1002 can indicate what types of services have been contracted out to third parties and whether appropriate controls are put in place to reduce liability exposure for actions performed by the third parties. For example, ineffective snow removal can increase the risk of slip-and-fall liability. Some services may have exposure to pollution liability risks, such as proper handling and disposal of oil or other fluids encountered during equipment repair and servicing. Visual and/or audio data may be helpful to establish the current condition of snow removal, security features, posted warning signs, and the like. The comments/media 1004 can include a number of input options to capture and link with the assessment data 424 of FIG. 4. For example, a text box 1006 can be used to directly type information to be stored in the assessment data 424 of FIG. 4. A video command 1008 may activate a video recording function of the photo and video capture module 410 of FIG. 4 using a combination of integrated camera 350 and microphone 370 of FIG. 3. A photo command 1010 may activate an image capturing function of the photo and video capture module 410 of FIG. 4 using integrated camera 350 of FIG. 3. Captured digital videos and/or digital photos can be linked to one or more physical assets or property conditions/features and stored in the image data 428 of FIG. 4. An audio record command 1012 may activate an audio capture function of the voice recognition module 412 of FIG. 4 using the microphone 370 of FIG. 3. Digitized audio data associated with one or more observed conditions of physical assets or property conditions/features can be stored in the audio data 430 of FIG. 4. In some embodiments, the voice recognition module 412 of FIG. 4 can convert the digitized audio data into text data for storage in the database 110 of FIG. 1 as text data, for instance, to make the data directly accessible and searchable.

Figure 11:
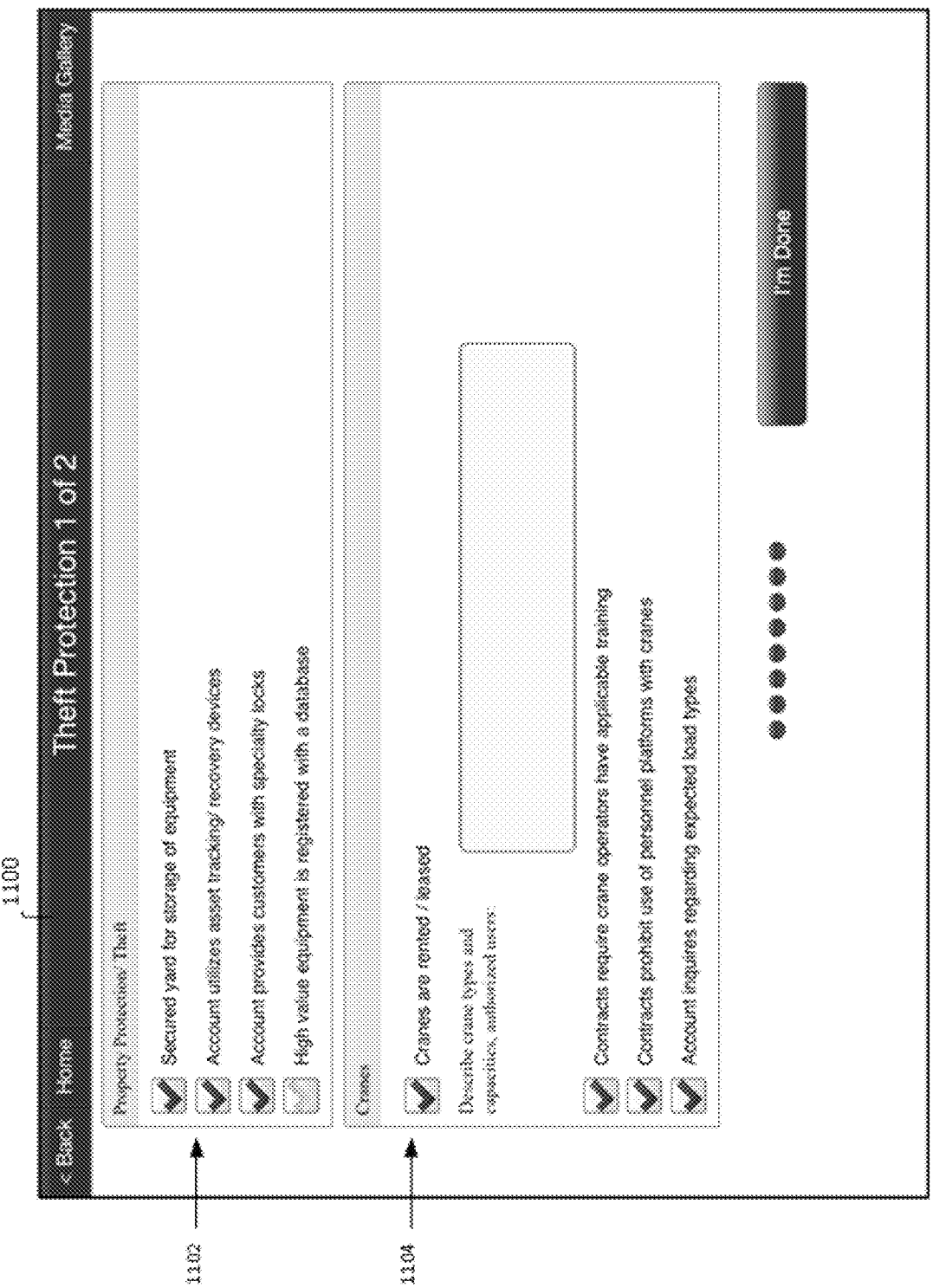
FIG. 11 depicts another example of a user interface according to some embodiments of the present invention.

FIG. 11 depicts another example of a user interface 1100 of the mobile assessment tool 114 of FIG. 1 according to some embodiments. The user interface 1100 is an example of a first screen for populating theft protection data, including property protection/theft 1102 and equipment data 1104. When insuring against risk of loss, data captured in the property protection/theft 1102 can provide an indication of a level of security with respect to fencing, individual locks, asset tracking and recovery devices, and records of registration. Audio and/or image data can be linked to provide evidence of locks and other security measures. Equipment data 1104 may be captured on an item-type basis and include data on equipment type, capacity, authorization requirements, and associated contractual provisions. Audio and/or image data may be linked to capture equipment details, modifications, and conditions.

Figure 12:
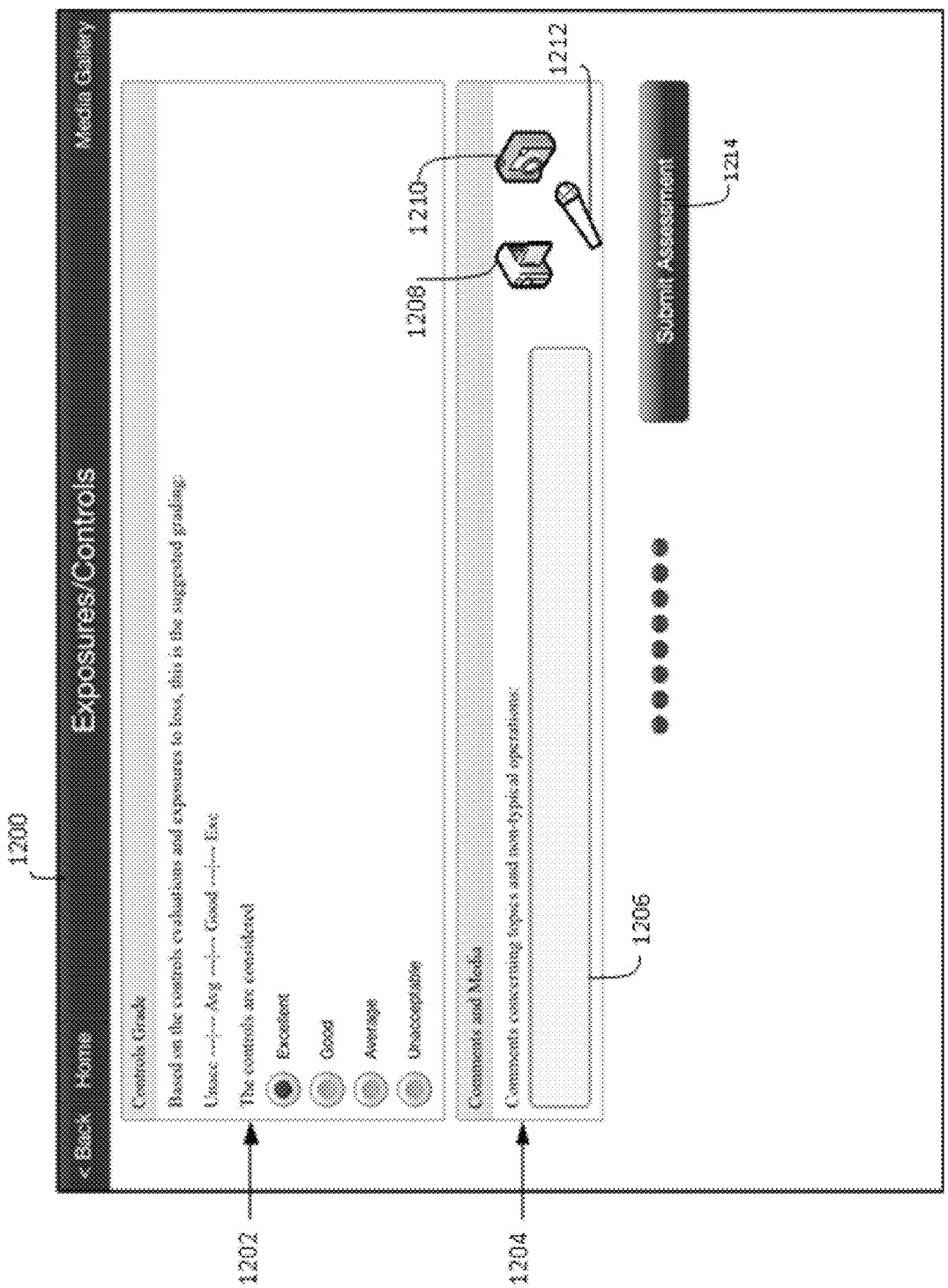
FIG. 12 depicts another example of a user interface according to some embodiments of the present invention.

FIG. 12 depicts another example of a user interface 1200 of the mobile assessment tool 114 of FIG. 1 according to some embodiments. The user interface 1200 is an example of an interface for exposures and controls information, including a controls grade 1202 and comments/media 1204. The controls grade 1202 provides the assessor's overall summary evaluation of controls to limit exposure to liability and limit losses. Support information and other details can be captured in the comments/media 1204. Similar to the example of FIG. 10, the comments/media 1204 can include a number of input options to capture and link with the assessment data 424 of FIG. 4. For example, a text box 1206 can be used to directly type information to be stored in the assessment data 424 of FIG. 4. A video command 1208, a photo command 1210, and an audio record command 1212 may all provide input options for capturing and linking the assessment data 424 of FIG. 4 with image data 428 and/or audio data 430 of FIG. 4. A submit assessment command 1214 can trigger sending of data from the local data 404 of FIG. 4 to the database 110 of FIG. 1 for storage in an assessment record, such as assessment record 501 of FIG. 5A or assessment record 511 of FIG. 5B.

Figure 13:
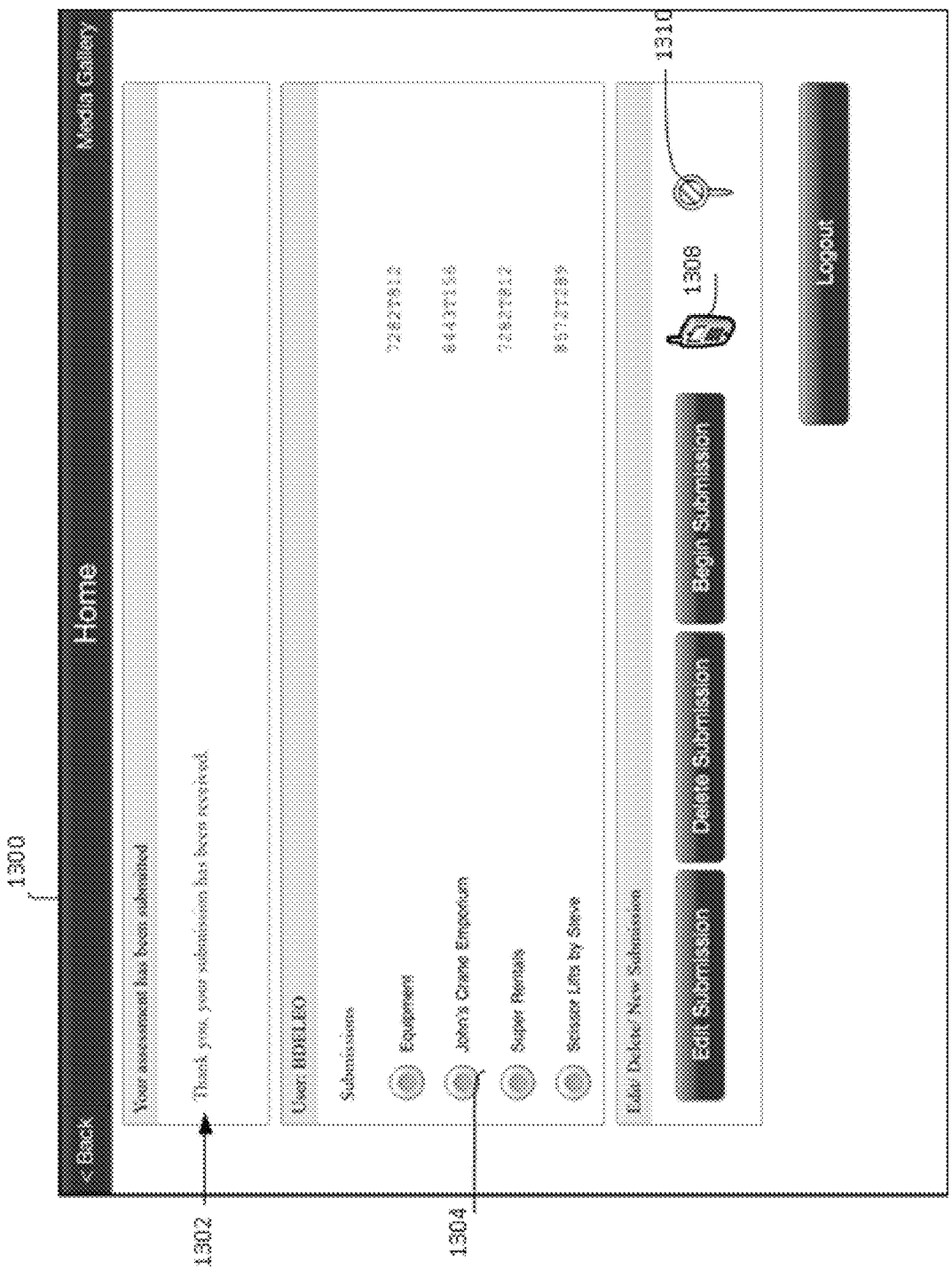
FIG. 13 depicts another example of a user interface according to some embodiments of the present invention.

FIG. 13 depicts another example of a user interface 1300 of the mobile assessment tool 114 of FIG. 1 as a modified version of the user interface 600 of FIG. 6 after assessment submission. The user interface 1300 may include a submission status 1302 that provides acknowledgement that the submission has been received by the database 110 of FIG. 1. Similar to the user interface 600 of FIG. 6, the user interface 1300 allows for selection from one or more previous submissions 1304 for editing or deleting. Further commands can be provided to begin a new submission or logout. The submission history 420 of FIG. 4 can be accessed for a history of previous submissions to be displayed as the one or more previous submissions 1304. The user interface 1300 may also include a command to initiate, accept, or terminate a two-way audio interface 1308. For example, if two-way audio was initiated by the command for the two-way audio interface 608 of FIG. 6, the two-way audio communication may be terminated using a command for the two-way audio interface 1308 of FIG. 13. The user interface 1300 can also include a command to enable or disable remote screen sharing 1310. For instance, if remote screen sharing was enabled using the command to enable remote screen sharing 610 of FIG. 6, then the remote screen sharing can be terminated using a command for remote screen sharing 1310 of FIG. 13.

Figure 14:
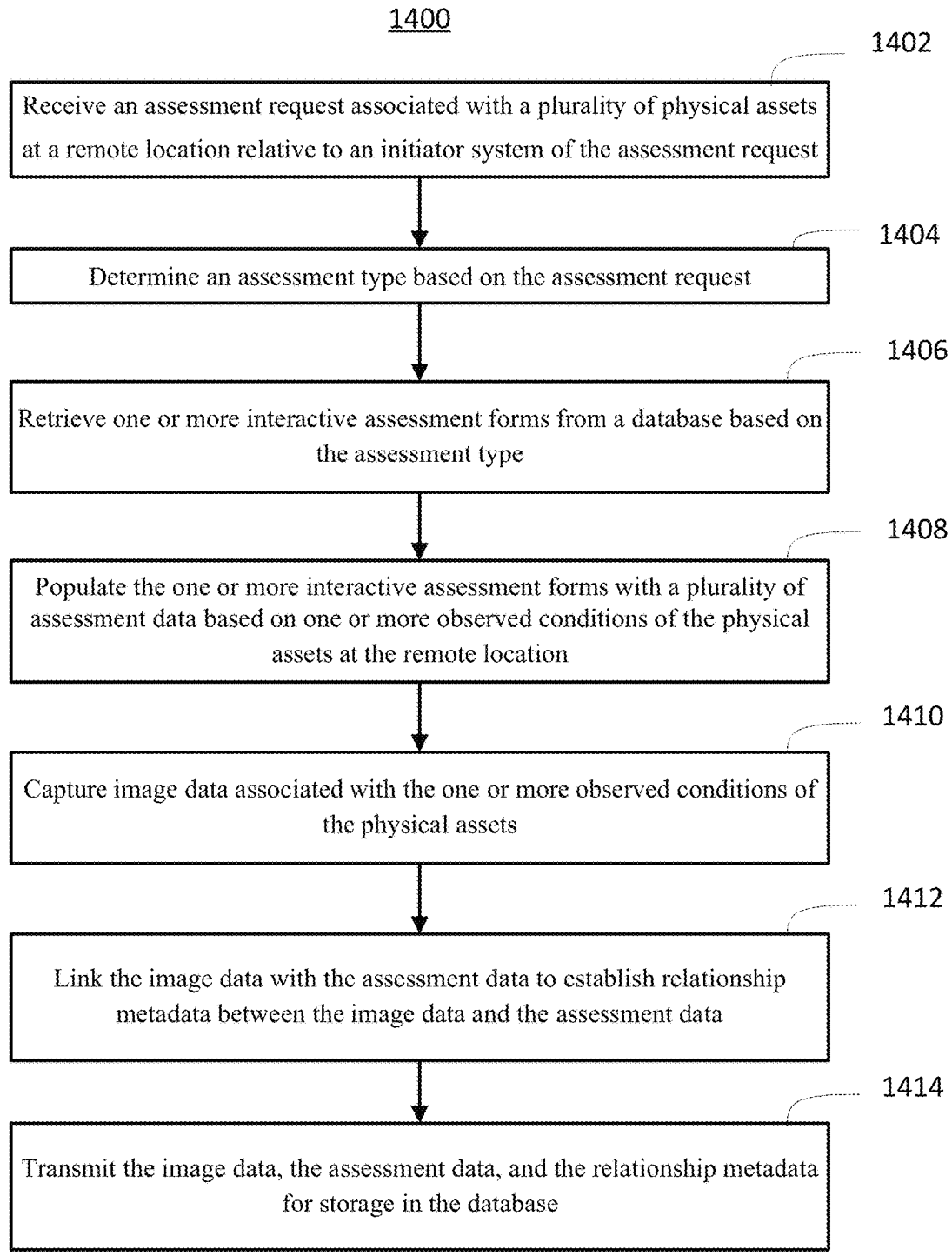
FIG. 14 depicts a process flow according to some embodiments of the present invention.

Turning now to FIG. 14, a process flow 1400 is depicted according to an embodiment. The process flow 1400 includes a number of steps that may be performed in the depicted sequence or in an alternate sequence. The process flow 1400 may be performed by the system 100 of FIG. 1. In one embodiment, the process flow 1400 is performed by one of the mobile computing devices 104 of FIG. 1. The process flow 1400 is further described in reference to FIGS. 1-14.

At step 1402, an assessment request is received from an initiator system of the assessment request, such as the initiator system 118. The assessment request can be associated with a plurality of physical assets 120 at a remote location 122 relative to the initiator system 118 of the assessment request. As previously described, the initiator system 118 can be at an office location 116 from which an assessor may travel to perform the assessment.

At step 1404, an assessment type is determined based on the assessment request. The assessment request can be received as an electronic mail message, text message, or other form of communication that identifies an assessment type. Known information about an entity type at the remote location 122 can be used to infer an assessment type.

At step 1406, one or more interactive assessment forms can be retrieved from the database 110 based on the assessment type, such as interactive assessment form definitions 502 with an assessment type identifier 503. The database 110 may be a cloud-based database accessible by the mobile computing device 104 and the initiator system 118 through one or more cloud server 108 across a network 106.

At step 1408, the one or more interactive assessment forms can be populated with a plurality of assessment data 424 based on one or more observed conditions of the physical assets 120 at the remote location 122. The assessment data 424 can also include other conditions and features at the remote location 122, as well as a characterization of various contracts and documentation.

At step 1410, image data 428 associated with the one or more observed conditions of the physical assets 120 can be captured. The image data 428 can be captured locally by the mobile computing device 104 using an integrated camera 350. The image data 428 may include one or more of: digital photos and digital video.

At step 1412, the image data 428 can be linked with the assessment data 424 to establish relationship metadata 426 between the image data 428 and the assessment data 424. Various one-to-one and one-to-many relationships can be captured in the relationship metadata 426.

At step 1414, the image data 428, the assessment data 424, and the relationship metadata 426 can be transmitted for storage in the database 110. The assessment data 424 may indicate a risk assessment at the remote location 122, and the database 110 may be accessible to the initiator system 118 to assess present risks and changes in risk.

In addition to capturing image data 428, the mobile computing device 104 can capture digitized audio data 430 associated with the one or more observed conditions of the physical assets 120. The digitized audio data 430 may be linked with the assessment data 424 to establish supplemental relationship metadata between the digitized audio data 430 and the assessment data 424 as depicted in the example of assessment record 511 relative to the assessment data 504, supplemental relationship metadata 514, and digitized audio data 512. The digitized audio data 512 and the supplemental relationship metadata 514 may be stored in the database 110. As a further alternative, the digitized audio data 430 can be converted into text data using a voice recognition module 412 and stored in the database 110 as text data.

The mobile assessment tool 114 can determine a current user of the mobile computing device 104 and may track a history of previous submissions to the database 110 by the current user. The mobile assessment tool 114 may also retrieve the image data 428, the assessment data 424, and the relationship metadata 426 from the database 110. The mobile assessment tool 114 can update one or more of: the image data 428, the assessment data 424, and the relationship metadata 426. Updates can be stored back into the database 110 as one or more of the image data 506, the assessment data 504, and the relationship metadata 508.

Figure 15:
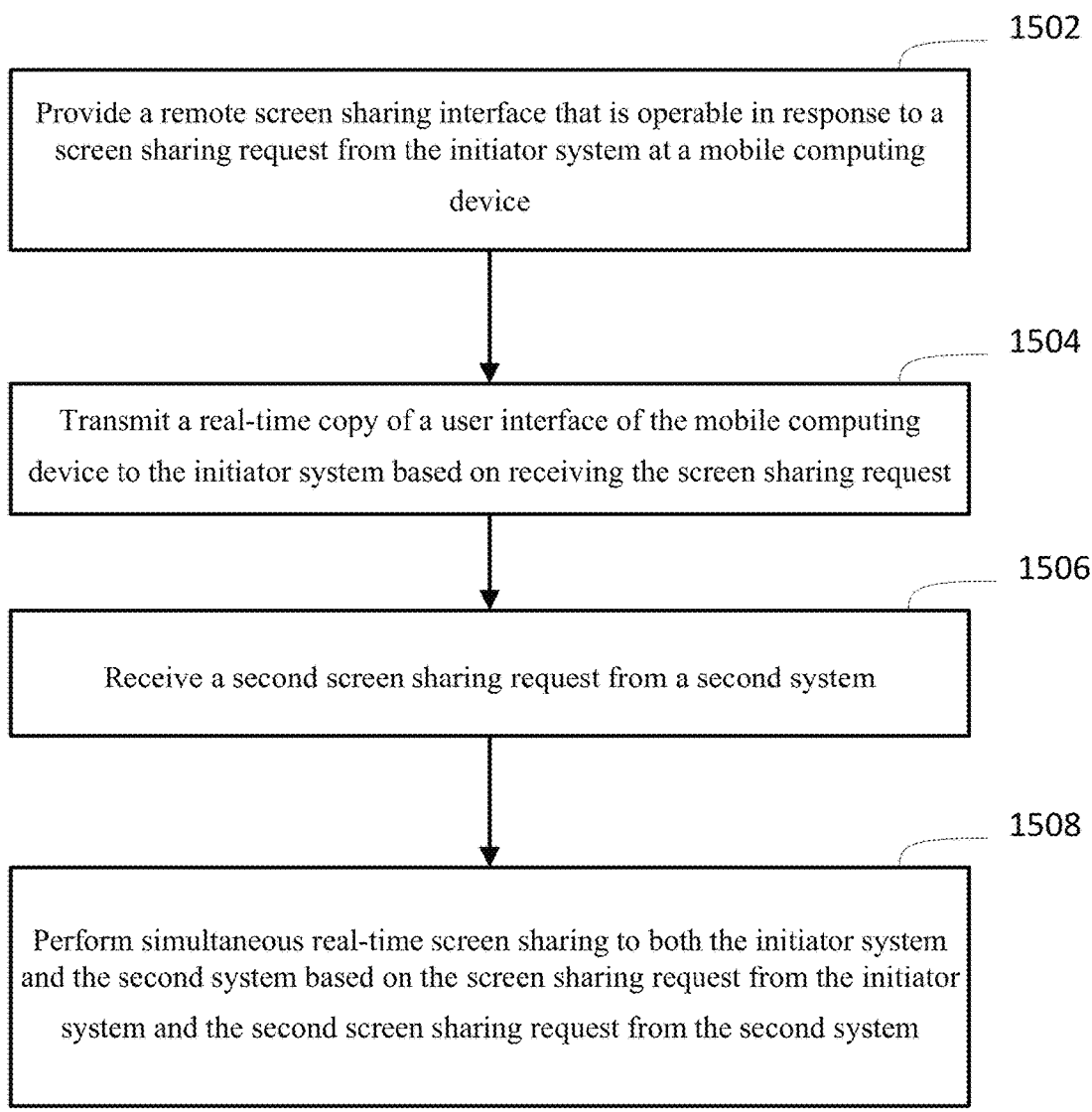
FIG. 15 depicts a process flow according to some embodiments of the present invention.

FIG. 15 depicts a process flow 1500 according to an embodiment. The process flow 1500 illustrates various steps that can be performed to enhance computer system performance by enhancing real-time data exchange between one of the mobile computing devices 104 and one or more of the management computer systems 102. In one embodiment, the process flow 1500 is performed by one of the mobile computing devices 104 of FIG. 1. The process flow 1500 is further described in reference to FIGS. 1-15.

At step 1502, a remote screen sharing interface that is operable in response to a screen sharing request from the initiator system 118 is provided via the remote screen sharing interface module 418. At step 1504, a real-time copy of a user interface of the mobile computing device 104 is transmitted to the initiator system 118 based on receiving the screen sharing request to provide an equivalent display as rendered by the display interface module 408. At step 1506, a second screen sharing request may be received from a second system, such as another instance of the management computer system 102. At step 1508, simultaneous real-time screen sharing to both the initiator system 118 and the second system can be performed based on the screen sharing request from the initiator system 118 and the second screen sharing request from the second system. The remote screen sharing interface module 418 can enable many more screen sharing requests from other systems to support multiple users overseeing operations on the mobile assessment tool 114. For example, different subject matter expert users or management users can observe data collection by an assessor using the mobile assessment tool 114 and provide real-time feedback, guidance, or suggestions while the assessor is physically located at the remote location 122 to optimize the data collection process and minimize a need for one or more return trips to gather supplemental information.

As previously noted, a two-way audio interface can be established between the mobile computing device 104 and the initiator system 118 that is active while populating one or more interactive assessment forms and capturing the image data 428 associated with one or more observed conditions of the physical assets 120. Real-time data collection feedback can be received from the initiator system 118 while populating one or more interactive assessment forms and capturing the image data 428. Based on the real-time data collection feedback, one or more of: modifying a data collection sequence based on the real-time data collection feedback and updating the image data 428 can be performed.

Figure 16:
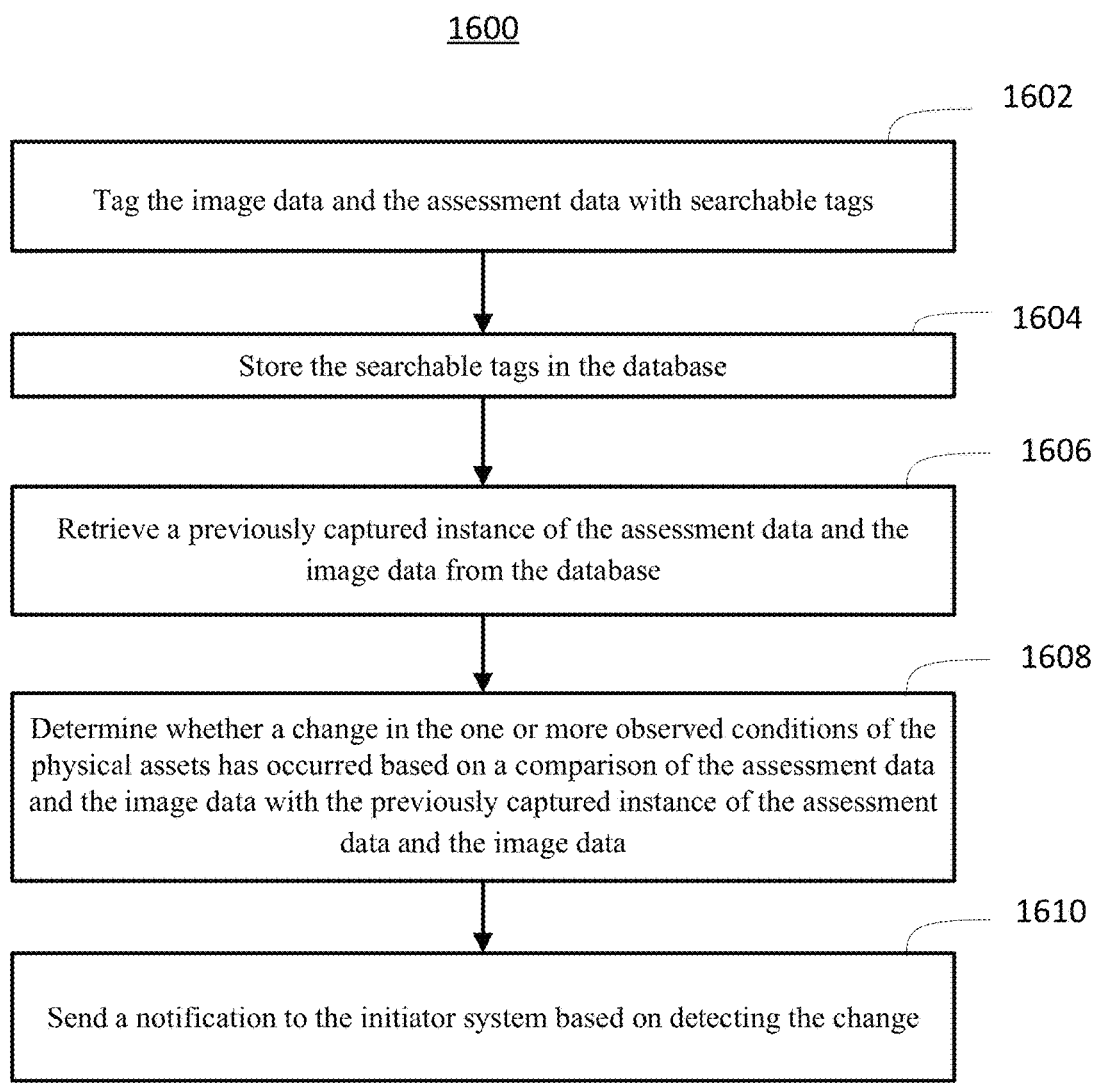
FIG. 16 depicts a process flow according to some embodiments of the present invention.

FIG. 16 depicts a process flow 1600 according to an embodiment. The process flow 1600 represents an example of data tagging for searching and retrieval, in addition to change detection. In one embodiment, the process flow 1600 is performed by one of the mobile computing devices 104 of FIG. 1. The process flow 1600 is further described in reference to FIGS. 1-16.

At step 1602, the image data 506 and the assessment data 504 can be tagged with searchable tags 516. At step 1604, the searchable tags 516 can be stored in the database 110. The searchable tags 516 may include geotag data 518 added to the image data 506 and stored in the database 110.

At step 1606, a previously captured instance of the assessment data 504 and/or the image data 506 can be retrieved from the database 110 as previously captured data 434. Newer versions or updates to data can be held in the local data 404, for instance as assessment data 424 and image data 428. At step 1608, the mobile assessment tool 114 can determine whether a change in one or more observed conditions of the physical assets 120 has occurred based on a comparison of the assessment data 424 and/or the image data 428 with the previously captured instance of the assessment data and the image data in the previously captured data 434. At step 1610, a notification can be sent to the initiator system 118 based on detecting the change. For example, if the condition of a previously observed physical asset was previously deemed to have adequate safety features but the safety features are no longer present; this condition can be highlighted for a user of the management computer system 102.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system comprising a mobile computing device configured to execute a mobile assessment tool and interface with a network, the mobile computing device comprising:
    a network interface configured to establish a plurality of communication channels over the network;
    a processing device; and
    a memory device in communication with the processing device, the memory device storing instructions of the mobile assessment tool that when executed by the processing device result in:

receiving an assessment request from an initiator system over the network via a first communication channel, the assessment request associated with a plurality of physical assets at a remote location relative to the initiator system of the assessment request;

determining an assessment type based on the assessment request;

retrieving one or more interactive assessment forms from a database based on the assessment type, wherein the database is network-accessible over the network via a second communication channel, and the database comprises a cloud-based database accessible by a plurality of mobile computing devices and the initiator system through a cloud server across the network;

populating the one or more interactive assessment forms with a plurality of assessment data based on one or more observed conditions of the physical assets at the remote location;

capturing image data associated with the one or more observed conditions of the physical assets;

capturing digitized audio data associated with the one or more observed conditions of the physical assets;

adding geotag data to the image data;

linking the image data with the assessment data to establish relationship metadata between the image data and the assessment data;

linking the digitized audio data with the assessment data to establish supplemental relationship metadata between the digitized audio data and the assessment data;

converting the digitized audio data into text data using a voice recognition module;

tagging the image data and the assessment data with searchable tags;

transmitting the image data with the geotag data, the assessment data, and the relationship metadata for storage in the database over the network via the second communication channel;

storing the searchable tags in the database;

storing the digitized audio data and the supplemental relationship metadata in the database, wherein the digitized audio data is stored in the database as the text data;

determining whether a previously captured instance of the assessment data and the image data are already loaded in the mobile computing device;

retrieving the previously captured instance of the assessment data and the image data from the database over the network via the second communication channel based on determining that the previously captured instance of the assessment data and the image data are unavailable in the mobile computing device;

determining whether a change in the one or more observed conditions of the physical assets has occurred based on a comparison of the assessment data and the image data with the previously captured instance of the assessment data and the image data and comparing updated geotag data with the geotag data from the previously captured instance of the image data from the database indicative of movement or repositioning of the physical assets; and sending a notification to the initiator system over the network via the first communication channel based on detecting the change to highlight the change in a management application executing on the initiator system and indicate whether the change comprises movement or repositioning of the physical assets.

2. The system of claim 1, wherein the image data is captured locally by the system using an integrated camera, and wherein the image data comprises one or more of: digital photos and digital video.

3. The system of claim 1, further comprising instructions that when executed by the processing device result in:
providing a remote screen sharing interface that is operable in response to a screen sharing request from the initiator system; and
transmitting a real-time copy of a user interface of the system to the initiator system based on receiving the screen sharing request.

4. The system of claim 3, further comprising instructions that when executed by the processing device result in:
receiving a second screen sharing request from a second system; and
performing simultaneous real-time screen sharing to both the initiator system and the second system based on the screen sharing request from the initiator system and the second screen sharing request from the second system.

5. The system of claim 1, further comprising instructions that when executed by the processing device result in:
establishing a two-way audio interface between the system and the initiator system that is active while populating the one or more interactive assessment forms and capturing the image data associated with the one or more observed conditions of the physical assets.

6. The system of claim 1, further comprising instructions that when executed by the processing device result in:
receiving real-time data collection feedback from the initiator system while populating the one or more interactive assessment forms and capturing the image data; and
performing one or more of: modifying a data collection sequence based on the real-time data collection feedback and updating the image data based on the real-time data collection feedback.

7. The system of claim 1, wherein the assessment data indicates a risk assessment at the remote location, and the database is accessible to the initiator system to assess present risks and changes in risk.

8. The system of claim 1, further comprising instructions that when executed by the processing device result in:
determining a current user of the system; and
tracking a history of previous submissions to the database by the current user.

9. The system of claim 1, further comprising instructions that when executed by the processing device result in:
retrieving the image data, the assessment data, and the relationship metadata from the database;
updating one or more of: the image data, the assessment data, and the relationship metadata; and
storing updates in the database.

10. The system of claim 1, wherein determining whether the change in the one or more observed conditions of the physical assets has occurred comprises performing an image comparison to detect one or more changes in a safety feature or a security feature of the physical assets.

11. A computer program product comprising a non-transitory storage medium embodied with computer program instructions that when executed by a computer cause the computer to implement:
receiving, by a mobile computing device configured to execute a mobile assessment tool and interface with a network, an assessment request from an initiator system over the network via a first communication channel, the assessment request associated with a plurality of physical assets at a remote location relative to the initiator system of the assessment request;

determining an assessment type based on the assessment request;

retrieving one or more interactive assessment forms from a database based on the assessment type, wherein the database is network-accessible over the network via a second communication channel, and the database comprises a cloud-based database accessible by a plurality of mobile computing devices and the initiator system through a cloud server across the network;

populating the one or more interactive assessment forms with a plurality of assessment data based on one or more observed conditions of the physical assets at the remote location;

capturing image data associated with the one or more observed conditions of the physical assets;

capturing digitized audio data associated with the one or more observed conditions of the physical assets;

adding geotag data to the image data;

linking the image data with the assessment data to establish relationship metadata between the image data and the assessment data;

linking the digitized audio data with the assessment data to establish supplemental relationship metadata between the digitized audio data and the assessment data;

converting the digitized audio data into text data using a voice recognition module;

tagging the image data and the assessment data with searchable tags;

transmitting the image data with the geotag data, the assessment data, and the relationship metadata for storage in the database over the network via the second communication channel;

storing the searchable tags in the database;

storing the digitized audio data and the supplemental relationship metadata in the database, wherein the digitized audio data is stored in the database as the text data;

determining whether a previously captured instance of the assessment data and the image data are already loaded in the mobile computing device;

retrieving the previously captured instance of the assessment data and the image data from the database over the network via the second communication channel based on determining that the previously captured instance of the assessment data and the image data are unavailable in the mobile computing device;

determining whether a change in the one or more observed conditions of the physical assets has occurred based on a comparison of the assessment data and the image data with the previously captured instance of the assessment data and the image data and comparing updated geotag data with the geotag data from the previously captured instance of the image data from the database indicative of movement or repositioning of the physical assets; and sending a notification to the initiator system over the network via the first communication channel based on detecting the change to highlight the change in a management application executing on the initiator system and indicate whether the change comprises movement or repositioning of the physical assets.

12. The computer program product of claim 11, further comprising computer program instructions that when executed by the computer cause the computer to implement:
providing a remote screen sharing interface that is operable in response to a screen sharing request from the initiator system; and
transmitting a real-time copy of a user interface of the system to the initiator system based on receiving the screen sharing request.

13. The computer program product of claim 12, further comprising computer program instructions that when executed by the computer cause the computer to implement:
receiving a second screen sharing request from a second system; and
performing simultaneous real-time screen sharing to both the initiator system and the second system based on the screen sharing request from the initiator system and the second screen sharing request from the second system.

14. The computer program product of claim 11, further comprising computer program instructions that when executed by the computer cause the computer to implement:
establishing a two-way audio interface between the system and the initiator system that is active while populating the one or more interactive assessment forms and capturing the image data associated with the one or more observed conditions of the physical assets.

15. The computer program product of claim 11, further comprising computer program instructions that when executed by the computer cause the computer to implement:
receiving real-time data collection feedback from the initiator system while populating the one or more interactive assessment forms and capturing the image data; and
performing one or more of: modifying a data collection sequence based on the real-time data collection feedback and updating the image data based on the real-time data collection feedback.

16. The computer program product of claim 11, wherein determining whether the change in the one or more observed conditions of the physical assets has occurred comprises performing an image comparison to detect one or more changes in a safety feature or a security feature of the physical assets.

* * * * *